United States Patent
Treger et al.

(10) Patent No.: US 6,514,637 B2
(45) Date of Patent: Feb. 4, 2003

(54) ALKALINE CELL WITH CATHODE SURFACE PROTECTOR

(75) Inventors: Jack Treger, Quincy, MA (US); Sean Sargeant, Lagrange, GA (US); John Licata, Malden, MA (US)

(73) Assignee: The Gillette Company, Boston, MA (US)

( * ) Notice: Subject to any disclaimer, the term of this patent is extended or adjusted under 35 U.S.C. 154(b) by 40 days.

(21) Appl. No.: 09/740,346

(22) Filed: Dec. 18, 2000

(65) Prior Publication Data

US 2001/0028976 A1 Oct. 11, 2001

Related U.S. Application Data

(63) Continuation-in-part of application No. 09/280,367, filed on Mar. 29, 1999, now abandoned.

(51) Int. Cl.[7] .............................. H01M 2/12; H01M 2/16
(52) U.S. Cl. ........................ 429/56; 429/129; 429/172; 429/249
(58) Field of Search ..................... 429/56, 172, 171, 429/173, 174, 129, 131–135, 249, 251

(56) References Cited

U.S. PATENT DOCUMENTS

| | | | |
|---|---|---|---|
| 1,526,817 A | * | 2/1925 | Wright |
| 3,617,386 A | * | 11/1971 | Bosben et al. |
| 4,154,912 A | * | 5/1979 | Philipp et al. |
| 4,315,062 A | | 2/1982 | Clarizio |
| 5,080,985 A | | 1/1992 | Wiacek et al. |
| 5,750,283 A | | 5/1998 | DePalma et al. |
| 5,759,713 A | * | 6/1998 | DePalma |
| 5,776,631 A | * | 7/1998 | Wu |
| 5,821,010 A | * | 10/1998 | Taylor |
| 5,856,040 A | * | 1/1999 | Newman et al. |
| 5,869,205 A | * | 2/1999 | Mick et al. |
| 6,025,090 A | | 2/2000 | Sargeant et al. |

FOREIGN PATENT DOCUMENTS

JP    52-25936 B   *   7/1977

OTHER PUBLICATIONS

Merriam–Webster's Collegiate Dictionary, 10th edition, 1999, p. 334.*

* cited by examiner

Primary Examiner—John Kim
Assistant Examiner—David Sorkin
(74) Attorney, Agent, or Firm—Barry D. Josephs; Paul I. Douglas; Thomas G. Krivulka

(57) ABSTRACT

An electrochemical separator is formed insitu on an electrode surface within an electrochemical cell, preferably an alkaline cell cathode surface. The alkaline cell comprises a zinc anode, a and potassium hydroxide electrolyte. The cathode may comprise a cathode comprising manganese dioxide. The separator may be formed by coating an electrode surface preferably with a low molecular weight copolymer of polyvinylalcohol and polyvinylacetate. The film can be coagulated to form a permeable separator uniformly conforming to and covering the electrode surface irrespective of the shape and contour of the electrode. A separate protector disk can be inserted onto the top surface of the cathode to protect the cathode from shorting in the event that imperfections in the separator surface develop. The protector disk can have a protruding lip which surrounds and protects the inside corner edge of the cathode.

18 Claims, 9 Drawing Sheets

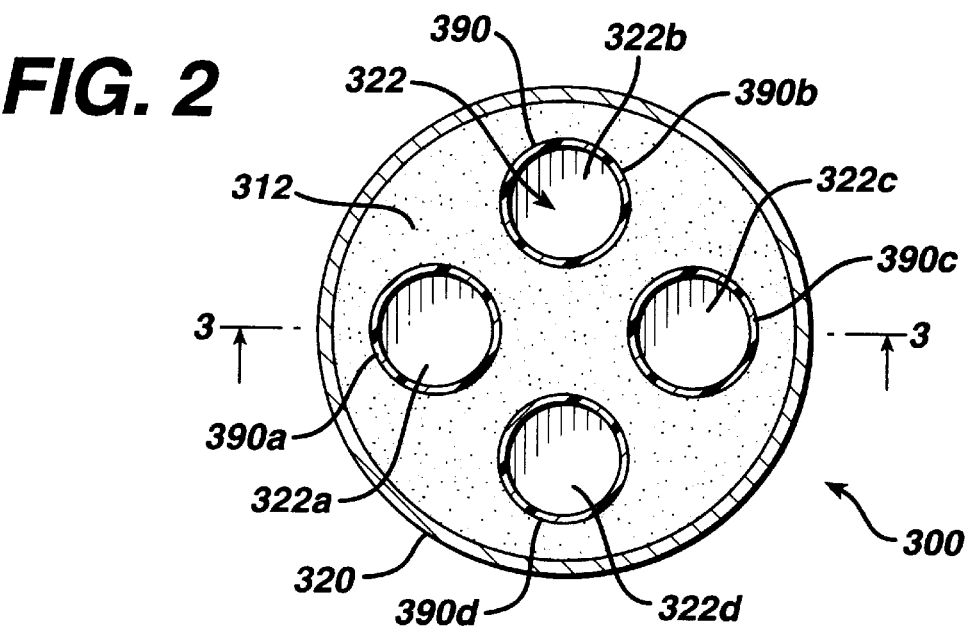
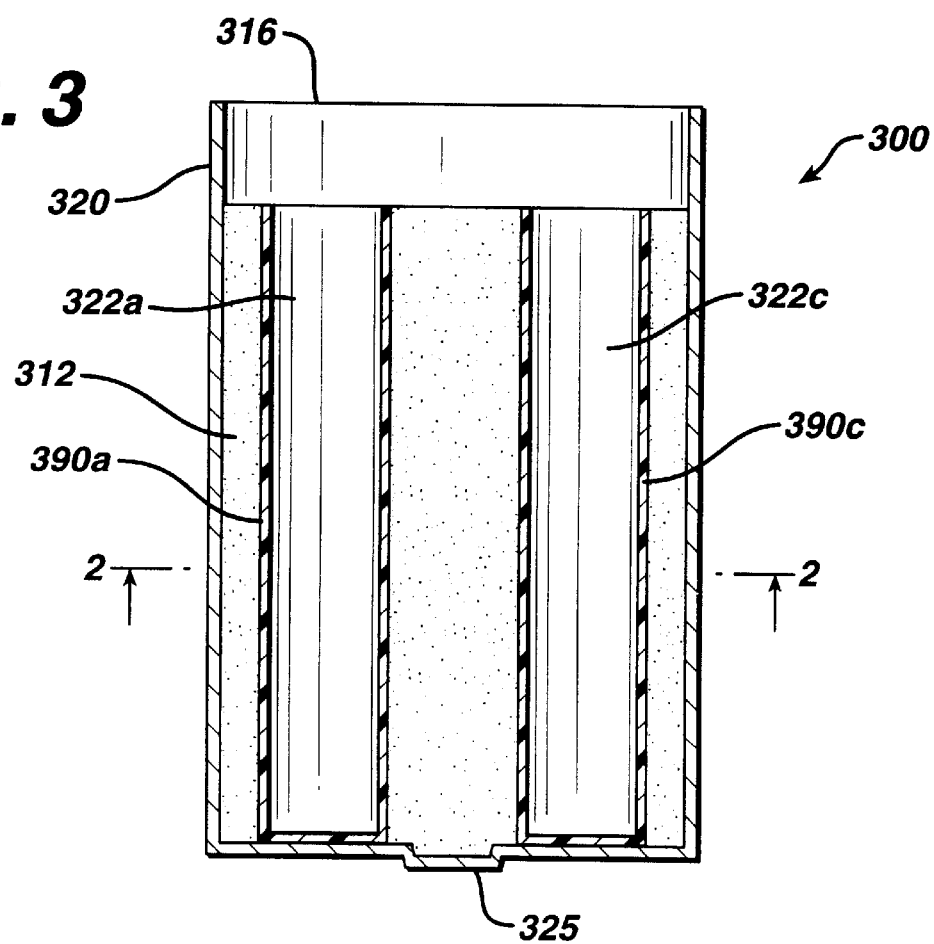

US 6,514,637 B2

1

ALKALINE CELL WITH CATHODE SURFACE PROTECTOR

CROSS REFERENCE TO RELATED APPLICATIONS

This application is a continuation in part of application Ser. No. 09/280,367 filed Mar. 29, 1999, now abandoned.

FIELD OF THE INVENTION

The invention relates to separators for electrochemical cells, particularly separators for alkaline cells, which cover an electrode surface, wherein the separator is formed by treating a film applied to the electrode surface. The invention also relates to a protector disk contacting the top surface of the cathode to protect the cathode from shorting.

BACKGROUND

Primary (non-rechargeable) alkaline cells typically contain an anode comprising active material of zinc, alkaline electrolyte, a cathode comprising active material of manganese dioxide, and an ion permeable separator sheet between the anode and cathode. The alkaline electrolyte is typically an aqueous solution of potassium hydroxide, but other alkali solutions of sodium or lithium hydroxide may also be employed. The cell contents are typically housed in a cylindrical steel casing (housing). The anode material comprises zinc particles admixed with zinc oxide and conventional gelling agents, such as carboxymethylcellulose or acrylic acid copolymers, and electrolyte solution. The gelling agent holds the zinc particles in place and in contact with each other. The cathode material comprises manganese dioxide and small amount of electrolyte and may also include small amounts of carbon or graphite to increase conductivity. The cathode material is conventionally a solid material compressed against the inside surface of the cell casing (housing) forming a hard compacted annular mass.

The separator is conventionally premanufactured outside of the cell. The separator is typically cut into two or more strips and inserted in the cell casing so that the strip edges overlap. The separator material covers the inside surface of the cathode and lies adjacent the anode. Additional electrolyte may optionally be added after the separator is inserted. In such case the separator absorbs the additional electrolyte and a portion of the electrolyte is reabsorbed into the cathode. Anode material may then be inserted into the core of the casing. The separator keeps the anode and cathode from physical contact.

The separator may be of woven or nonwoven ion permeable material. The separator is ion permeable, but yet prevents passage of active anode or cathode material therethrough. Conventional ion permeable separators for alkaline cells may be formed of a single sheet of fibrous woven or nonwoven material. Such single sheet is prefabricated outside of the cell and inserted into the cell, typically in overlapping strips, after the cathode has been inserted into the casing. The fibrous woven or nonwoven sheet may comprise a combination of fibrous material, typically comprising polyvinylalcohol fibers and cellulosic fibers. Conventional separators may also be made of multiple layers of such fibrous nonwoven material laminated to each other.

Conventional separator sheets for alkaline cells may comprise a dual layer of an ion permeable film membrane laminated to a fibrous nonwoven material. The film membrane may be of a cellulosic material typically cellophane. The cellulosic film membrane may be laminated to a fibrous nonwoven material comprising polyvinylalcohol fibers and cellulosic fibers. The cellulosic film membrane prevents zinc dendrites from penetrating into the cathode where they may cause shorting of the cell. Zinc dendrites can form in the anode during prolonged discharge. The cellulosic film membrane, however, can noticeably increase the internal resistance of the cell, particularly, in high power application. The fibrous nonwoven material provides support for the cellulosic membrane and also functions to absorb electrolyte which can be reabsorbed by the electrodes. The polyvinylalcohol fiber component in the nonwoven material withstands attack by alkaline electrolyte and lends structural support to the nonwoven layer. The cellulosic fibers gives the nonwoven much of its absorbency characteristic.

Such conventional separators which are prefabricated outside of the cell, whether of single or multiple layer, have a significant thickness, typically between about 5 mil and 10 mil (0.127 mm and 0.254 mm), more typically about 8 mil (0.203 mm). As such, they may consume a significant percentage of the internal volume of a small size cell. For example, when inserted into AA alkaline cells, such conventional separators may typically consume between about 3 and 20 percent of the useable internal cell volume by a combination of separator thickness and non-uniform conformation. Such conventional separators can only be made to conform to and cover either flat surfaces or surfaces that are only gradually and uniformly contoured, that is, surfaces which do not have steep angle of curvature or surfaces which do not have reverse curvature.

It is desirable that the separator be applied to cover cathode surfaces of essentially any shape and surface contour.

It is desirable to protect the top surface of the cathode in a manner which reduces the chance of shorting in the event that the separator develops surface irregularites along the cathode surface.

It is desirable that the separator, when applied to alkaline cells, be of minimal thickness yet durable, ion permeable, and resistant to attack by alkaline electrolyte.

It is desirable that the separator's ionic resistance be low enough that it does not significantly impede the cell's performance especially at high rates of discharge.

It is desirable that the separator resist passage of zinc dendrites from anode to cathode.

SUMMARY OF THE INVENTION

An aspect of the invention is directed to a method of forming a separator in an electrochemical cell having casing, anode, cathode and electrolyte, comprising the steps of coating one of the anode or cathode surfaces with a material to form a film on said surface and treating said film to form a separator contacting said electrode surface. The method of the invention is particularly suitable for forming a separator on a surface of the cathode in the cell casing of an alkaline cell. The cathode surface on which the separator is formed may be of any shape or contour. The alkaline cell may have single or multiple anode cavities. The separator may be in the form of an ion permeable film contacting and conforming to the surface of said electrode.

The method of the invention has particular application generally to forming separator film insitu on the surface of an electrode in the cell casing of bobbin type electrochemical cells, particularly bobbin type alkaline cells. Such alkaline cells, for example, may conventionally have an anode comprising zinc and cathode comprising manganese dioxide and alkaline electrolyte, or they may be in the form of conventional zinc-air cells having alkaline electrolyte, and an anode comprising zinc which is depolarized with air. Such bobbin cells are characterized by having at least one of the electrodes in the form of a discrete lump of solid or semisolid mass which is separately inserted into the cell casing. Conventional bobbin cells typically have a cylindrical casing with an open end and a closed end. After the cell contents are inserted into the casing, an end cap assembly comprising an insulating sealing disk (plug) with current collector therethrough and an end cap is inserted into the open end and the casing. The casing is crimped over the peripheral edge of the insulating sealing disk to seal the cell. The bobbin cell to which the method of the invention is applicable is distinguishable from cells wherein the electrodes are in wrapped jelly roll configuration. In the latter cells the electrodes are coated as thin layers onto conductive substrates to form a laminate with separator therebetween. The laminate is rolled into a jelly roll configuration and the rolled laminate inserted into the cell casing. The process of the invention, therefore, may be applied to forming electrode/separator laminates useful in lithium/manganese dioxide primary cells or in forming electrode/separator laminates in secondary (rechargeable cells).

An aspect of the invention is directed to providing electrical insulating protection to the top surface of the cathode to prevent shorting in the event that the insitu separator develops cracks, or surface irregularities in this region of the cell. The term cathode top surface as used herein shall mean the surface of the cathode facing the open end of the cell. The cathodes for alkaline bobbin cells are typically in the form of elongated members, for example disk or cylindrical shape having an annular region comprising cathode material. The outside surface of the cathode typically is in contact with and runs along most of the cell's casing inside surface. The cathode inside surface typically defines a cavity which runs along the cathode length and forms the anode cavity with electrolyte permeable separator therebetween. Alkaline cells typically have one anode cavity but they can also have a plurality of separate anode cavities, each defined by separate hollow regions, typically within the cathode. The anode cavity is defined by the cathode inside surface which can be of smooth circular, semicircular shape, or elliptical shape. The cathode inside surface can also have a convoluted shape such as that defined by a continuous closed surface having alternating convex and concave portions, or irregular curvatures.

The cathode edge protector member of the invention, desirably is in the form of a disk inserted over the top surface of the cathode after the cathode has been inserted into the casing and the cathode inside surface has been coated with separator material. The top surface of the cathode is the cathode surface in closest proximity to the open end of the casing and tyically faces the casing open end. The protector disk is of material which is electrically insulating and is durable and does not corrode or deform when exposed to alkaline electrolyte. The protector disk is characterized by having a solid annular surface and at least one protruding lip extending therefrom which defines at least one hollow core running through the protector disk. The protruding lip defining the hollow core can be in the form a continuous, preferably circumferential, surface protruding from the protector disk solid annular surface. The hollow core through the protector disk, defined by said protruding lip, preferably conforms to the size and shape of the anode cavity. If the cell has a plurality of anode cavities, the protector disk can have a plurality of hollow cores running through the protector disk with each hollow core defined by a separate protruding lip. Each hollow core within the protector disk preferably conforms to the shape and size of each of the cell's anode cavities, respectively, when viewed in cross section through a plane perpendicular to the cell' longitudinal axis.

The protector disk annular solid surface in plan view desirably has an overall shape conforming to the shape of the cathode top surface. Preferably, the size and shape of the protector disk annular solid surface is about the same as the size and shape of the cathode top surface. The protruding lip defining the hollow regions through the disk desirably has a length between about 0.5 and 2 mm, but can be longer. After the cathode is inserted in the cell casing and separator material is applied to the exposed cathode inside surface, the protector disk is inserted preferably so that its annular surface comes to lie flush against the cathode top surface. The protruding lip penetrates into the anode cavity and comes to rest against the portion of the cathode inside surface adjacent the cathode top surface. Thus, the protector disk of the invention when inserted into the cell protects the cathode top surface and cathode corner edge at the juncture of the cathode top surface and cathode inside surface.

In another aspect the protector disk can have a raised circumferential outer edge which interlocks with a skirt protruding from the insulating sealing disk. The protector disk can also have a downwardly extending lip which covers the top inside surface of the cathode. The interlocking protector disk provides an impenetrable barrier between the anode material and the cell casing.

In another aspect the cell can be provided with an insulating sealing disk (plug) with a circumferential skirt protruding therefrom. The insulating sealing disk typically also has a rupturable membrane therein. A portion of said skirt extends over and contacts a portion of the cathode inside surface. A second portion of the skirt can contact and cover a portion of the cathode top surface. The circumferential skirt thereby covers the top inside corner edge of the cathode and provides an impenetrable barrier between the anode material and the cell casing. The insulating sealing disk in this case also functions as a cathode edge protector thereby assuring that anode material cannot penetrate passed the sealing disk and onto the cathode top surface.

The cathode protector disk of the invention is especially applicable whenever alkaline cell cathodes are coated with a polymeric film while the cathode lies insitu in the cell to form a separator film adhering to the cathode as described herein. However, the protector disk of the invention can also be used when the separators are formed exsitu, that is, outside of the cell and separately inserted in an already preformed shape into the cell.

An aspect of the invention is directed to applying a first material, preferably as a liquid or semisolid gel, on a surface of a cell electrode to form a film on said surface while the electrode is in the cell casing and then allowing the film to dry or cure insitu into a separator or treating the film with a second material, heat, light, radiation or other energy to form a separator in contact with said electrode surface. The first material may exist as a liquid or as a semisolid as defined in the Detailed Description section. If the cathode protector disk of the invention is employed, it can be inserted into the cell after the separator film is formed on the electrode.

The film on the electrode surface, which may be liquid or semisolid, may comprise polymers which may be coagulated when the second material is applied to form a solid ion permeable separator in contact with the electrode surface.

Alternatively, the film on the electrode may be dried by treating it with heated or cooled convective air, ambient air, or heated or cooled inert gas (e.g. helium or argon) or other gaseous medium or by exposing the film to a vacuum or to an infrared or other radiation source to form an ion permeable separator on the electrode. In this instance the film is composed of a polymer or compound dissolved or dispersed in a volatile aqueous or non-aqueous fluid. Alternatively, the film coated onto the electrode surface may comprise monomers or oligomers which may be polymerized to form a separator in contact with said surface. (The monomers or oligomers may be crosslinked which term as used herein is intended to be included as a form of polymerization.) The monomers or oligomers in the film coated on the electrode surface may be polymerized by applying conventional polymerization techniques such as by applying heat, light (ultra violet or visible light) ionizing radiation (e.g, gamma radiation) to the film.

Alternatively, the monomers in the film may be polymerized by contact with liquid containing free radical initiator or anionic or cationic initiator. The resulting polymers may be formed from the same or dissimilar monomers contained within the film.

Alternatively, the liquid or semisolid film on the electrode surface may comprise a fluid with a melting point higher than 60° C. which freezes into a solid separator at room temperature. In such case the film may be applied to the electrode surface at a temperature which is above the melting point of said fluid and then the film is left to stand at room temperature whereupon it freezes into a solid separator.

A specific aspect of the invention is directed to a method of forming an ion permeable separator in an alkaline cell, comprising the steps of coating a surface of the cathode (or anode) insitu (while in the cell casing) with a first material which may be a liquid mixture comprising a polymeric material (which may be pre-catalyzed) to form a liquid or semisolid film (e.g. gel) on a surface of said cathode (or anode), and contacting the liquid or semisolid film with a second material (which may be a liquid or gaseous medium or air) or exposing the film to an energy source causing the film to dry, coagulate or polymerize into a solid or semisolid, ion permeable film separator contacting said surface. Thus, the separator made by the process of the invention may be a solid or semisolid during operation of the cell as it is exposed to normal ambient conditions, e.g. between about −20° F. and 120° F. (−28.8° C. and 48.8° C.).

Particulate filler, preferably, zinc oxide particles may be added to the liquid or semisolid mixture forming said liquid or semisolid film on the electrode surface to increase the porosity and absorbency of the final separator film. The alkaline cell preferably has a casing, an anode comprising zinc and a cathode comprising manganese dioxide, and an electrolyte comprising potassium hydroxide. The formation of an ion permeable separator in this manner allows for the formation of very thin separators, for example, having a uniform thickness of between about 1 mil and 4 mil (0.0254 mm and 0.102 mm), preferably between about 1 and 3 mils (0.0254 mm and 0.0762 mm). Such thin separators make available significantly more internal volume of the cell in smaller size cells, for example, AA size or smaller cells. The saved cell volume can be used to supply the cell with additional amount of active material or electrolyte to increase cell energy or power capacity. Such separators made by the insitu process of the invention will readily conform to, cover and adhere to a cell electrode surface, particularly an alkaline cell cathode surface, of essentially any shape and contour including (but not by way of any limitation) any flat, circular, curved, dimpled, scraped surfaces as well as any surfaces having reverse curvature. Internal cell design should not be limited to electrode shapes which can be covered by premanufactured and precut separators. The separators made by the insitu process of the invention can be applied to any shaped electrode, thereby not restricting the cell designer to any particular shaped electrode.

BRIEF DESCRIPTION OF THE DRAWINGS

The invention will be better understood with reference to the drawings in which:

FIG. 2 is a cross sectional view along sight lines 2—2 of the alkaline cell of FIG. 3 having four anode cavities with a separator of the invention lining the cathode surface adjacent each cavity.

FIG. 3 is a cross sectional elevational view along sight lines 3—3 of the alkaline cell of FIG. 2 having four anode cavities with a separator of the invention lining the cathode surface adjacent each cavity.

DETAILED DESCRIPTION

Definitions

Figure 1:
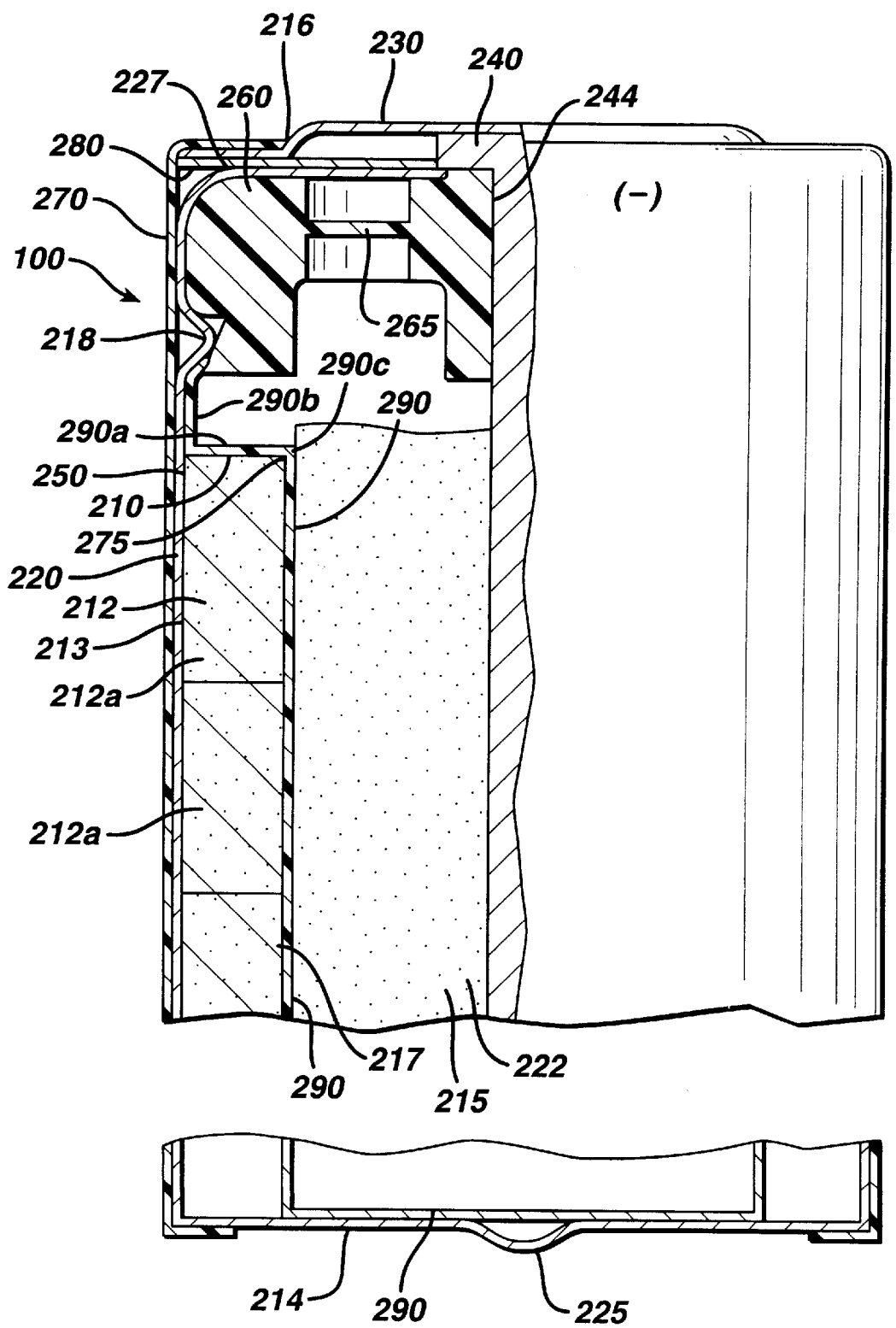
FIG. 1 is a cross sectional elevational view of a representative alkaline cell employing the separator of the invention.

Ion permeable material is defined as material allowing passage of (hydroxide) ions and water. Conversely non ion permeable material is defined as material which does not allow the passage of (hydroxide) ions and water.

Porous film is defined as a film having pores that are typically visible to the naked eye, thus having a pore size in a range between about 50 to 1000 micron or higher as determined by transmission electron microscopy (T.E.M.). The term porous film as used herein is also ion permeable.

Pore size is defined as average pore diameter. In pores of irregular shape the pore diameter is taken as the smallest dimension between opposing edges.

Solid or Solidified Film as defined herein is a thin continuous sheet of material that is neither liquid nor gas, and is without cracks or defects which could impair its intended insulating or barrier function. Solid film, for example, is a continuous sheet of material that has extremely high or infinite viscosity (ie. viscosity is greater than 100,000 centipoise at room temperature using a Brookfield viscometer with RV4 spindel at 20 revolutions per minute) and does not flow or yield (ie. viscosity remains greater than 100,000 centipoise) under any shear forces encountered during application or function of the material in its intended environment.

Semisolid as used herein is intended to broadly cover all physical states which are intermediate in property between true solid and true liquid. A semisolid film as used herein (for example, but not by way of any limitation) as a thin continuous sheet of material which does not flow of its own accord and has an extremely high or infinite viscosity under zero or near zero shear rate conditions but flows or yields under the predetermined shear rate conditions that may exist during application of the film to the surface. Thus, the term semisolid is intended to include (for example, but not by way of any limitation) physical states having the soft texture and rheological properties commonly associated with putties or gels. (A gel can be considered, for example, a solid material suspended in liquid medium to form a jelly-like mass that retains a characteristic shape.) The semisolid material as used herein includes (for example, but not by way of any limitation) materials that are not free flowing as is a liquid but generally requires an external force in order to cause the material to move through a conduit. In this regard the term semisolid is intended to include such highly viscous material, for example, at least as viscous as molasses and having a measurable kinematic viscosity at 20° C. The term semisolid is also intended (for example, but not by way of any limitation) to apply to materials which may be extrudable and which can be deformed without fracturing upon exertion of external pressure.

Liquid Film is defined as a thin continous sheet of material that exhibits a readiness to flow, for example, flows under its own stress at zero shear rate conditions.

Microporous film is defined as a film having pores that are not typically visible to the naked eye, thus a pore size of between about 0.01–50 microns as determined by transmission electron microscopy (T.E.M.). The pores may pass straight through the thickness of the film. The term microporous film as used herein is also ion permeable.

Nonporous film is defined as a film having interstitial spaces (spaces between polymer molecules) of size of less than 0.01 microns as determined by transmission electron microscopy. The interstitial spaces typically do not run straight through the film thickness for film having a thickness of at least about 1 micron, but rather the interstitial spaces characteristically run a tortuous path between polymer molecules. The term nonporous film as used herein is understood to be ion permeable.

Film porosity is the percent of the apparent volume of the film which is occupied by everything therein except solids. Thus the porosity can be calculated by determining the volume occupied by electrolyte, other liquids and entrapped air (including volume of liquid and air entrapped within the micropores of solids) and dividing that volume by the apparent volume of the cathode and multiplying by 100. (The apparent volume is the overall volume of a sample as contained within the external boundary of the sample.)

Fiber is an elongated structure; a filament or strand. A fiber is a strand of material typically having tightly compacted polymer molecules oriented substantially in parallel relationship within a given space. The strands of polymer molecule may overlap. The fibers themselves are nonporous in that the interstitial spaces between polymer molecules do not run straight through the fiber thickness, but rather run a tortuous path between the polymers. A common definition requires an aspect ratio (ratio of length to width) of at least 100, typically >1000. To be useful in a web structure (either woven or non-woven) the fiber desirably has a minimum tensile strength and elongation as defined by tenacity. Typical non-woven fibers have a tenacity at break of between about 1 g/denier (cellulose acetate) and 5 g/denier (nylon). Denier is defined as the weight in grams of 9000 meters of fiber and is proportional to the density and cross-sectional area of the fiber.

Electrochemical Separator as made by the insitu process of the invention is defined as comprising a solid or semisolid material, preferably in the form of a film, that is ion permeable and electronically insulating. The absolute ionic resistivity of the electrochemical separator, by way of example and not intended as any particular limitation, is advantageously between about 10 and 250 millohms-cm$^2$ (using an aqueous solution of 40 percent by weight KOH) for thickness range desirably between about 1 and 4 mil (0.0254 mm and 0.102 mm). (The specific ionic resistivity of the separator is calculable by dividing the absolute ionic resistivity by the separator thickness in centimeters). The electrically insulating properties of the electrochemical separator is required to prevent self-discharge of the cell and the absolute electrical resistivity is typically greater than 1 megaohm-cm$^2$. (The specific electrical resistivity of the separator is calculable by dividing the absolute electrical resistivity by the separator thicknes in centimeters). The electrochemical separator has sufficient mechanical strength to prevent rupture or physical contact of the cell electrodes. The separator desirably is chemically stable towards the electrolyte and electrodes, that is, maintains its mechanical, ion permeable and electronic insulating properties when in contact with both the cell electrolyte and electrodes over the lifetime of the cell.

Film separators made outside of the cell are defined as a material in the form of a solid or semisolid film which is intended to be used as an electrochemical separator (above defined) either alone or laminated to woven or non woven fibrous material.

Insitu film separator formed within the cell by the process of the invention is defined as a film formed from a liquid or semisolid material which is coated onto an electrode surface, preferably a cathode surface of an alkaline cell, which may be treated while on the electrode surface (insitu) to form a solid or semisolid separator. This includes film material precatalyzed or preactivated before application to the electrode or after application by addition of another material or else treated, for example, by heat, light or radiation.

Woven or nonwoven fibrous separator is material comprising fibers as above defined wherein the fibrous material forms a sheet of porous material useful as an electrochmeical separator or portion thereof. In a nonwoven fibrous separator the individual fibers within the sheet are preferably adhered to each other by an adhesive such as the film of this invention or by thermal melting to form fibrous network having pores therebetween running through the thickness of the sheet to allow passage of electrolyte ions therethrough. In a woven fibrous separator the individual fibers may be machine woven forming a fibrous network having pores therebetween allowing passage of electrolyte ions.

The present invention is directed to the formation and manufacture of the separator material within the cell casing, insitu, that is, within the cell casing itself. In one application the process of the invention is advantageously applied to forming separators within alkaline cells having a cathode comprising manganese dioxide and an anode comprising zinc, and electrolyte comprising potassium hydroxide.

In the process of the invention a liquid coating film is applied over the exposed surface of one of the cell electrodes. When applied to an alkaline cell the liquid or semisolid (e.g., gel) film forming the separator is advantageously applied to the exposed surface of the cathode after the cathode has been inserted into the cell casing and prior to insertion of anode material. The liquid or semisolid coating film is then either polymerized or coagulated resulting in a solid or semisolid ion permeable film membrane which conforms to and covers the exposed surface of the cathode prior to insertion of anode material. The separator, made in this manner, will readily conform to, cover, and adhere to alkaline cell cathode surfaces of essentially any shape and contour. A pre-placed conventional film or nonwoven separator cannot uniformly conform to cells that utilize a non-cylindrical or extended area electrode geometry.

The separator, made by the process of the invention, can be made much thinner than conventional separators which are manufactured and cut to size outside of the cell. The ion permeable insitu film separator as made by the process of the invention can be made very thin, for example between about 1 and 4 mils, preferably between about 1 mil and 3 mils (0.0254 mm and 0.0762 mm) thickness. More preferably, the ion permeable insitu film separator as made by the process of the invention may be made between about 1 mil and 2.5 mils (0.0254 mm and 0.0635 mm) thickness, typically about 2 mil (0.0508 mm) thickness. If a conventional film or nonwoven separator of such small thickness were fabricated outside of the cell, it would not be possible to uniformly cover conventional alkaline cell cathode surfaces (whether flat or cylindrically shaped) with such thin separators because of the difficulty in handling and placing very thin films at high manufacture speed without damaging them. Ion permeable separators made by the process of the invention can be made within a broad range of thicknesses if desired, for example, thicknesses between about 1 and 10 mils. (0.0254 mm and 0.254 mm) and higher, but has particular advantage when formed at thickness range between about 1 and 4 mils (0.0254 mm and 0.102 mm), preferably between about 1 and 3 mils (0.0254 mm and 0.0762 mm).

The use of a 2 mil (0.0508 mm) thick separator made by the process of the invention when applied to a conventional AA alkaline cell, allows for about 17 percent by weight more anode and cathode active material in the AA cell than a conventional 8 mil (0.203 mm) thick separator of single layer fibrous nonwoven material. The use of a 2 mil (0.0508 mm) thick separator of the invention can be expected to increase the theoretical capacity of an alkaline cell by between about 15 and 20 percent.

A representative alkaline cell configuration which can employ the separator of the invention is shown in FIG. 1.

The alkaline cell 100 is representative of a primary (nonrechargeable) alkaline cell to which the separator of the invention may be applied. The alkaline cell 100 comprises a cylindrical steel casing (housing) 220, having a closed end (base) 214 and an open end 216. The cell is filled with cathode 212 comprising $MnO_2$ particles, an anode slurry 215 comprising zinc particles, and electrolyte. Cell 100 as shown in FIG. 1 is a bobbin type cell in that at least one of the electrodes in the cell is in the form of discrete lumped mass inserted within the cell casing. As shown in FIG. 1 both anode 215 and cathode 212 reside in the cell casing 220 in the form of lumped masses. The alkaline cell 100 preferably contains "zero amounts" of added mercury. Such zero-added mercury cell contains no added amounts of mercury, but may contain only the residual amount of mercury present in commercially available pure zinc, including the residual amount of mercury, if any, present in the other cell components. The total mercury content in such cells is less than 50 parts mercury per million parts total cell weight, typically less than 10 parts mercury per million parts total cell weight. The electrolyte can comprise a conventional mixture of KOH, ZnO and gelling agent. The cathode 212 can be in the form of a plurality of stacked compacted annular solid blocks 212a. The outside surface 213 of the solid blocks 212a contacts the inside surface of casing 220 and the inside surface 217 of blocks 212a faces the cell core 222. The anode 215 and cathode 212 may be separated by the separator 290 of the invention. Separator 290 may be made by the insitu method of the invention herein described by applying a coating of liquid (or semisolid) polymer mixture to the inside surface 217 of the annular cathode 212 and on the inside surface of the closed end (base) 214 of the casing 100. The liquid (or semisolid) coating mixture may then be coagulated or polymerized as described herein, to form a solid ion permeable separator film 290 on cathode inside surface 217 and on the inside of casing base 214.

After cell 100 is filled, an end cap assembly is inserted to close the open end 216 of the casing. The end cap assembly comprises an end cap and an electrically insulating plug which is preferably in the form of an electrically insulating sealing disk 260 having a rupturable membrane 265 therein. The insulating sealing disk 260 has an elongated electrically conductive current collector 240 passing therethrough, the current collector being in electrical contact with an end cap 230. The insulating sealing disk seals the open end of the housing and provides electrical insulation between said current collector 240 and casing 220. The current collector 240 can desirably be of brass, tin plated brass, bronze, copper, or indium plated brass. The plastic insulating sealing disk (plug) 260 can be first separately inserted into open end 216. Insulating disk 260 has an integral thin membrane section 265, typically circular, which will rupture and let gas escape therethrough, should the gas pressure within the cell build up and exceed a predetermined level. The insulating sealing disk (plug) 260 is preferably snap fitted around circumferential step 218 as shown in FIG. 1 so that the plug locks in place into the open end 216. The peripheral edge 227 of casing 220 is crimped over the top of insulating sealing disk 260. A paper insulating washer 280 is applied over the crimped peripheral edge 227 of casing 220. Insulating washer 280 may be a polyethylene coated paper washer. A terminal end cap 230 is welded to the head of current collector 240. The elongated current collector 240 can then be inserted (force fitted) into aperture 244 of insulating plug 260 so that end cap 230 comes to rest against insulating washer 280. Conventional asphalt sealant can be preapplied around the current collector 240 before it is inserted into aperture 244. A film label 270 is applied around casing 220. The terminal end cap 230 becomes the negative terminal of alkaline cell 100 and pip 225 at the closed end of casing 20 becomes the positive terminal.

Additives can be employed, as conventional, to modify the cell chemistry. Alkaline cell 100 is not intended to be restricted to any particular cell chemistry or cell size. Thus cell 100 can contain conventional alkaline cell chemistries including those which contain zero added mercury (less than 50 parts mercury per million parts total cell weight, preferably less than 10 parts mercury per million parts total cell weight) and modifications thereof. Such representative chemistries, for example, are disclosed in U.S. Pat. No. 5,401,590, herein incorporated by reference.

The separator of the invention may be used to line an electrode of any shape and contour. For example, another representative electrode configuration for an alkaline cell which can employ the separator of the invention is shown in FIGS. 2 and 3. The alkaline cell 300 shown in FIGS. 2 and 3 has four discrete anode cavities 322a, 322b, 322c and 322d. The anode cavities are cylindrical cavities formed within cathode 312 as shown in the figures. The separator of the invention can be formed within each of the anode cavities by the process of the invention to form separators 390a, 390b, 390c and 390d on the cathode surface defining the walls of each of the anode cavities 322a, 322b, 322c and 322d, respectively. After the separators are formed, anode slurry is inserted into the anode cavities and an end cap and insulating plug is inserted into the open 316 of casing 320 to seal the casing in the manner described with reference to the cell embodiment shown in FIG. 1. The cell may have elongated current collectors extending from the end cap into each of the anode cavities similar to current collector 240 shown in FIG. 1.

Figure 4:
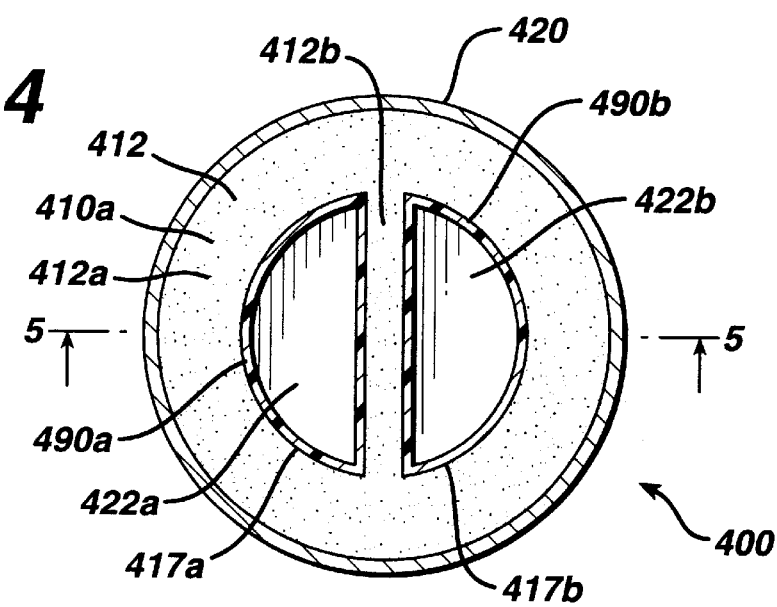
FIG. 4 is a cross sectional view along sight lines 4—4 of the alkaline cell of FIG. 5 having two anode cavities with a separator of the invention lining the cathode surface adjacent each cavity.
Figure 5:
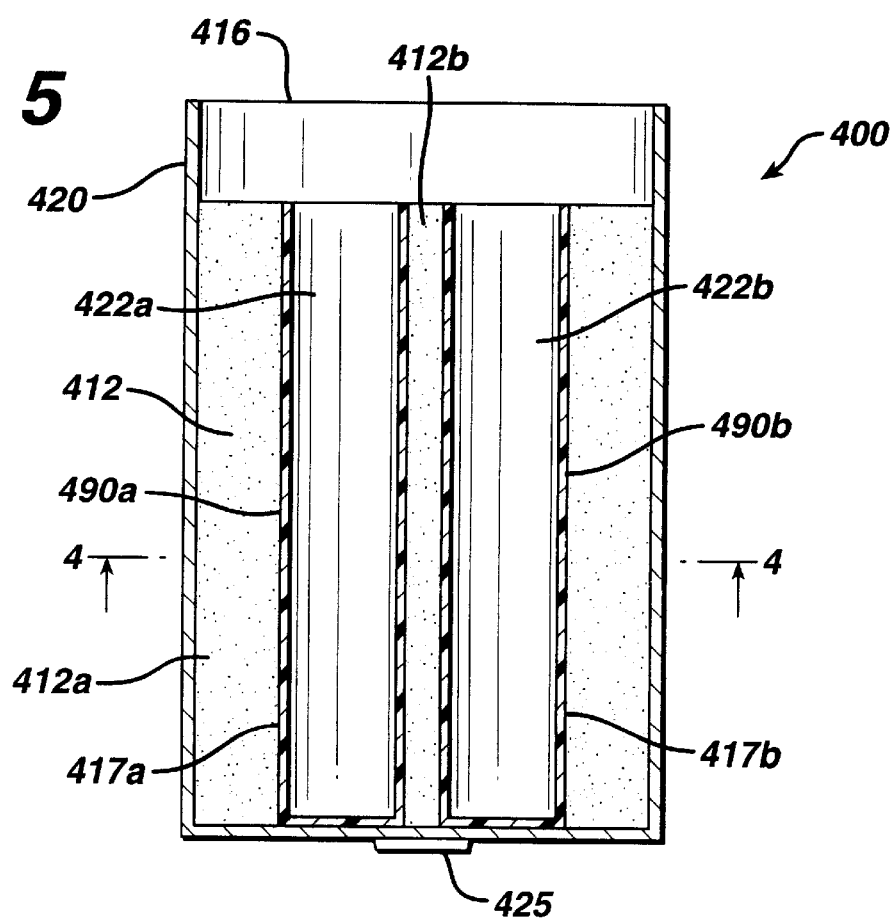
FIG. 5 is a cross sectional view along sight lines 5—5 of the alkaline cell of FIG. 4 having two anode cavities with a separator of the invention lining the cathode surface adjacent each cavity.

Another representative electrode configuration for an alkaline cell which may employ the separator of the invention is shown in FIGS. 4 and 5. The alkaline cell 400 shown in FIGS. 4 and 5 has two discrete anode cavities 422a and 422b. The anode cavities 422a and 422b are semi-cylindrical cavities formed within cathode 412 as shown in the figures. The separator of the invention may be formed within each of the anode cavities by the process of the invention to form separators 490a and 490b on the cathode surface defining the walls of each of the anode cavities 422a and 422b, respectively. After the separators are formed, anode slurry is inserted into cavities 422a and 422b and an end cap and insulating plug may be inserted into the open 416 of casing 420 to seal the casing in the manner described with reference to the cell embodiment shown in FIG. 1. The cell may have elongated current collectors extending from the end cap into each of the anode cavities similar to current collector 240 shown in FIG. 1. Representative alkaline cells having the electrode configuration shown in FIGS. 2–5 are disclosed in U.S. Pat. No. 5,869,205, herein incorporated by reference in the entirety.

The separator of the invention may also be advantageously applied to zinc air alkaline cells. All of the coating mixtures herein described for insitu formation of a liquid or semisolid (e.g. gel) film on the cathode and the insitu process of the invention as herein described wherein the liquid or semisolid film on the cathode is dried, coagulated or polymerized to form a solid or semisolid separator film, is applicable as well to zinc air cells. This type of cell is well known and has wide commercial application as power source for hearing aids. The zinc air cell is typically in the form of a button shaped cell. A representative zinc air cell is shown and described in U.S. Pat. No. 3,897,265, incorporated herein by reference, in its entirety. The zinc air cell has an anode comprising zinc particles. Air functions as the depolarizer (cathode). The electrolyte is alkaline, preferably aqueous solution of potassium hydroxide. The electrochemical reaction is catalyzed by a catalyst typically comprising manganese dioxide or carbon or a mixture of both manganese dioxide and carbon. The catalyst material is considered part of the cathode. These cells typically have an air inlet, air diffuser membrane and underlying disk containing the catalyst material which forms a portion of the cathode. The conventional zinc air cell is commericially sold in the form of a button cell used to power hearing aids. Such cells are bobbin type cells in that at least one of the electrodes, namely the anode is in the form of a discrete lumped mass of material. There is a sheet of porous separator material which separates the zinc anode from the cathode. A conventional separator employed in zinc air cells may be CELGARD 5550 microporous polypropylene film from Celanese Co. The separator material conventionally employed in zinc air cells, because of their porosity, results in gradual oxidation of the zinc anode from seepage of atmospheric air, even when the cell is not being used. The separator of the invention, made by the above described insitu process, generally can be made to have less porosity than separators conventionally used in zinc air cells, but yet is sufficiently ion permeable to allow the cell to discharge. Such use of the separator of the invention in zinc air cells in place of conventional separators can markedly improve the shelf life of the cell. The zinc anode material can be placed into the anode cavity and then the separator liquid or semisolid material of the invention placed over the zinc material and thereafter treated, for example, by drying, coagulation or polymerization, as described herein, to form a separator.

The process of the invention allows easy control of the separator's thickness during the insitu process of manufacture. The final thickness of the separator may be controlled by the viscosity of the coating solution, the percentage solids of the coating solution and the amount of time allowed for the solution to gravity drain from the cathode surface prior to the addition of the alkaline coagulating solution. The thin separator of the invention has the advantage that it takes up noticeably less percentage of the cell's available internal volume in small size cells, e.g. AA cells, than conventional separators which are manufactured and cut to size outside of the cell. Also, the separator of the invention is effective in preventing zinc dendrites from passing from anode to cathode of the alkaline cell. The separator of the invention is ion permeable and yet otherwise impermeable to passage of anode and cathode material therethrough. The separator's resistance is low enough that it does not significantly impede cell's performance. The separator is durable and withstands attack by alkaline electrolyte.

The separator of the invention has resistance comparable to the resistance of conventional single layer separators employing fibrous nonwoven material, when compared under low to medium AA cell power consumption, e.g., under 1 Watt. At about 1 Watt AA power consumption the resistance of the separator of the invention may be slightly higher than that of conventional separators formed of fibrous nonwoven material, but nevertheless allows for good cell performance even at high power (1 Watt) usage. By adding alkaline extractable fillers such as zinc oxide to the separator coating solution, sufficient porosity can be created to enhance the ionic conductivity enough to match or exceed the high power (1 watt) capability of conventional nonwoven separators formed of fibrous material.

The separator 290 of the invention is a solid film membrane which may typically be nonporous or microporous as above defined, and is ion permeable. Separator 290 can be formed by preparing a liquid (or semisolid) polymer mixture, and applying the mixture to the inside surface 217 of cathode material which is already in the cell 100. The liquid polymer (or semisolid, preferably in the form of polymer gel) mixture is applied to the inside surface 217 of cathode 212 and inside surface of casing base 214 before the anode material 215 is injected into the cell. Advantageously a full or partial vacuum may be applied to the cathode 212 and inside surface of casing base 214 prior to and during the application of the liquid polymer (or semisolid gel) to the cathode surface 217. Such application of a full or partial vacuum prevents pinhole formation and improves the consistency of the coating. The liquid polymer (or semisolid gel) mixture forms a uniform liquid (or semisolid gel) coating covering inside surface 217 of the cathode and the inside surface of casing base 214. The liquid (or semisolid gel) coating is polymerized or coagulated insitu (while on the cathode surface in the cell) to form a solid or semisolid insitu film separator uniformly covering and adhering to said cathode surface 217 and casing base 214. The solid insitu film separator 290 is a continuous film of uniform thickness having a thickness preferably between about 1 and 4 mils (0.0254 mm and 0.102 mm), preferably 1 and 3 mils (0.0254 and 0.0762 mm), more preferably betweeen about 1 and 2.5 mils (0.0254 mm and 0.0635 mm). The cathode material 212 to be coated is typically in the cell in the form of a plurality of stacked compressed solid disks 212a comprising manganese dioxide. The outside surface 213 of the cathode disks 212a contact the inside surface 250 of cell casing 220. In such embodiment the inside surface 217 of the cathode disks 212a, that is, the surface facing the casing core 222 as well as the inside surface of casing base 214 is coated with said liquid (or semisolid) polymer mixture. Conventional dip coating, extrusion coating, immersion coating or spray coating technique can be used to coat the cathode surface 217 and inside surface of casing base 214 with the liquid (or semisolid) polymer mixture. This is done prior to adding anode material 215, so that the liquid (or semisolid) mixture coats exposed surface 217 of the cathode material. The aqueous alkaline solution, preferably an aqueous solution comprising potassium hydroxide (KOH), can then be applied over the liquid (or semisolid) polymeric film. The film coagulates to form a solid (or semisolid) film membrane which functions as the cell's separator. Additional electrolyte can optionally be added which can be absorbed into the cathode. Anode slurry material 215 is then injected into the cell. The separator film membrane 290 physically separates the anode 215 from the cathode 212.

In one preferred embodiment the separator of the invention is formed by preparing an aqueous mixture of polymeric material comprising polyvinylalcohol. The polymeric material can be polyvinylalcohol 100% hydrolyzed or preferably, the polymeric material can comprise a copolymer of polyvinylalcohol and polyvinylacetate. More preferably the mixture comprises a mixture of at least two groups of straight chain copolymers of polyvinylalcohol and polyvinylacetate, each group being in a different range of average molecular weight. The polyvinylalcohol/polyvinylacetate copolymers desirably contain only a small amount polyvinylacetate about 10 wt %, the remainder being polyvinylalcohol about 90 wt %. The polyvinylacetate in the copolymer increases the solubility of the polymer in water compared to 100% hydrolyzed polyvinylalcohol. This allows for a more concentrated solution of the polymer to be formed for a given aqueous solution viscosity. The polymer mixture is thus preferably in the form of an aqueous solution with the polymer material dissolved in water. Also, in order to form a polymer solution that will result in an adhered coating that is not too thin (preferred coating thickness is desirably about 2 mil (0.0508 mm)), the polyvinylalcohol/polyvinylacetate copolymer molecular weight ranges is desirably selected such that the polymer solution has a higher concentration of polymer solids while yet not making the solution viscosity so high that it cannot be readily coated. (Viscosity of the polymer solution may desirably be between about 200 and 2000 centipoise, typically about 600 centipoise, at room temperature using a Brookfield viscometer with RV4 spindle at 20 revolutions per minute.) This can be achieved by having the major component of the mixture a polyvinylalcohol/polyvinylacetate copolymer which is in a relatively low molecular weight range. Such component, for example, may be selected from polyvinylalcohol/polyvinylacetate copolymer available as Aldrich PVA 36307-3 copolymer (average molecular weight 31,000–50,000). A smaller amount of a higher molecular weight polyvinylalcohol/polyvinylacetate copolymer may be added to the formulation to impart greater mechanical strength and flexibility to the insitu film separator. It is preferable that the copolymers be straight chain. This helps to assure that the resulting aqueous solution will be a free flowing Newtonian liquid which can be readily coated onto an electrode surface. A preferred formulation may be made by admixing the following polyvinylalcohol/polyvinylacetate copolymers in water to form an aqueous solution. The polymers are available from Aldrich Co. under the given trade designations: Aldrich PVA 36307-3 (average molecular weight 31,000–50,000 and 87–89% hydrolyzed); Aldrich PVA 36308-1 (average molecular weight 85,000–146,000 and 87–89% hydrolyzed); and Aldrich PVA 36310-3 (average molecular weight 124,000–186,000 and 87–89% hydrolyzed). A surfactant (defoamer) such as Surfynol SE available from Air Products Co. may be added to the aqueous solution to retard the formation of air bubbles therein.

Preferably, the aqueous solution comprising polyvinylalcohol or copolymer of polyvinylalcohol and polyvinylacetate is coated onto the exposed surface of cathode material in the cell prior to application of anode material. An alkaline solution, preferably comprising potassium hydroxide is then applied to the surface of the coating. Upon exposure to the KOH the wet film coagulates within several minutes under ambient temperature, to form a solid membrane film which functions as the cell's separator. The separator film made in this manner may be considered nonporous as above defined, but is nevertheless ion permeable. The speed of coagulation can be hastened by elevating the temperature of the KOH solution and/or the cathode material. After the separator is formed on the cathode surface the anode material may then be added and the separator film will physically separate the anode from the cathode. The composition of a preferred aqueous mixture applied to the cathode surface is given as follows:

| Separator Liquid Formula 1 | |
| --- | --- |
| Copolymer of polyvinyl alcohol and polyvinylacetate: | Wt. % |
| Aldrich PVA 36307-3 (M.W. 31,000–50,000) | 11.0 |
| Aldrich PVA 36308-1 (M.W. 85,000–146,000) | 3.0 |
| Aldrich PVA 36310-3 (M.W. 124,000–186,000) | 1.0 |
| Surfactant: Surfynol SE | 0.25 |
| Water: | 84.75 |
| Total | 100.0 |

The Formulation 1 mixture is prepared by adding the above listed Polyvinyalcohol/polyvinlyacetate solids and surfactant Surfynol SE to water and mixing. The mixture is heated to 60° C. and mixed until the solids are dissolved and a homogeneous solution is obtained. The solution is left to stand or alternatively may be centrifuged until all air bubbles are released. The viscosity of the solution is about 600 centipoise at room temperature using a Brookfield viscometer with an RV4 spindel at 20 revolutions per minute and the rheology (fluid flow characteristics) of the solution is Newtonian.

In application an alkaline cell 100 may be prepared in conventional manner by utilizing an open ended cylindrical casing 220. A compressed solid annular mass of cathode material 212 may be placed in the casing in conventional manner either in the form of one solid mass or in the form of a plurality of stacked disks 212a as shown in FIG. 1. The cathode mass 212 has its outside surface 213 pressed in contact against the inside surface 250 of casing 220. The inside surface of the cathode material is exposed to the hollow central core 222 of the casing (before anode slurry 215 is inserted). The aqueous solution is made in accordance with Formulation 1 is then applied to the cell insitu by pouring it into the hollow core 222 of the casing so that it completely fills hollow core 222. The cell casing is then immediately inverted and drained of the aqueous solution leaving a wet film of the solution about 10 mil (0.254 mm) thick covering and conforming to the inside surface 217 of the cathode. The liquid film is sufficiently viscous that it adheres to the cathode surface. A solution of electrolyte comprising between about 30 and 40 percent by weight potassium hydroxide is then added to the casing so that it completely fills the central core 222 and contacts the entire exposed surface of the film. The electrolyte solution is left to stand for about 5 minutes, whereupon the polymeric material in the film becomes coagulated into a solid film. The electrolyte solution is drained from the casing leaving a solid membrane separator 290 of thickness of between about 1 and 3 mil (0.0254 mm and 0.0762 mm), typically between about 1 and 2.5 mil (0.0254 mm and 0.0635 mm) adhered to the entire inside surface 217 of cathode 212. A gelled anode slurry 215 comprising zinc powder may then be added to fill the central core 222 of casing 220. The cell is sealed in conventional manner by crimping the peripheral edge 227 of the casing over insulating plug 260. The insulating washer 280 is placed over the peripheral edge 227 of casing 220 and then the current collector 240 is forced into aperture 244 of insulating plug 260. Terminal end cap 230 is physically attached to current collector 240.

The Formulation 1 separator is sufficiently conductive to allow excellent performance in zinc/MnO$_2$ alkaline cells under normal operating conditions, under about 1 Watt power consumption, e.g. between about 1 and 800 milliamp drain. Use of the Formulation 1 separator, 2 mil (0.0508 mm) thick, in AA alkaline cells can increase the cell's theoretical capacity by between about 15 and 20 percent compared to the same cell with conventional separator having a fibrous nonwoven layer, 8 mil (0.203 mm) thick. The conductivity of the formulation 1 separator may be slightly less than the conductivity of conventional separators when the cell is discharged under high power application, for example, at about 1 Watt. However, satisfactory discharge performance is also achieved at high power (1 Watt) in AA cells employing the separator of the invention at 2 mil (0.0508 mm) thickness. Also, the absorbency of the Formulation 1 insitu film separator of the invention may not as high as that of conventional separators comprising a fibrous nonwoven layer. However, if the cathode material is prewetted with electrolyte, the separator need only be ion permeable, that is, it is not necessary that the separator be highly absorbent.

The conductivity as well as the absorbency of the separator of the invention may be improved by a adding a particulate filler material which is extractable or dissolvable upon exposure to alkaline, preferably potassium hydroxide. It has been determined that zinc oxide (ZnO) can be effectively used as such filler. The zinc oxide (ZnO) average particle size (longest dimension) may be between about 0.01 and 100 micron, preferably between about 0.1 and 10 micron. Such particulate zinc oxide may be readily added to Formulation 1 to form a modified coating liquid. The zinc oxide filled coating solution can be prepared by adding zinc oxide directly to Formulation 1 using high intensity mixing such as a Cowles Mixer, 3 Roll Mill or Ball Mill. The polyvinylalcohol/polyvinylacetate copolymers are capable of dispersing and stablizing the zinc oxide by absorptive mechanisms. A modified coating liquid prepared in this manner and having a concentration of about 60% zinc oxide is given as Formulation 2. Such modified coating liquids, e.g., Formulations 2, containing particulate zinc oxide may be applied to the cathode as above described with reference to Formulation 1 in order to form a liquid film over the exposed cathode surface. When alkaline, preferably KOH, is added to coagulate the film, the alkaline (KOH) leaches (extracts) the zinc oxide (ZnO) filler from the film as it is being formed into a solid film. The action leaves microcavities in the solidified insitu film separator, in place of the particulate filler, thus increasing the porosity and absorbency of the insitu film separator. The film thus becomes microporous having an average pores size between about 0.01 and 100 micron, preferably between about 0.1 and 10 microns, as described in the above definition. The creation of the microcavities within the insitu film separator also increases the conductivity of the separator, especially under high power (1 Watt) application. The leaching effect and creation of additional microcavities in the separator may continue after the cell is loaded with electrolyte and stored.

Separator Liquid
Formula 2

| Copolymers of polyvinylalcohol and polyvinylacetate: | Wt. % |
|---|---|
| Aldrich PVA 36307-3 (M.W. 31,000–50,000) | 11.0 |
| Aldrich PVA 36308-1 (M.W. 85,000–146,000) | 3.0 |
| Aldrich PVA 36310-3 (M.W. 124,000–186,000) | 1.0 |
| ZnO (Avg. size 1 to 5 micron) | 22.5 |
| Surfactant/Defoamer Surfynol SE | 0.25 |
| Water: | 62.25 |
| Total: | 100.0 |

Instead of or in addition to polyvinylalcohol and its copolymers, other polymers may be used in the invention. Requirements for said polymer include that it be soluble or dispersible in a non-aqueous or, preferably, in an aqueous fluid. A liquid polymer solution or dispersion is preferably formed containing such polymer. The polymer solution or dispersion is applied to a surface of a cell electrode in the cell casing to form a film on said surface as above described. The film may then be dried as by convective air drying or by infrared radiation to form a separator on the electrode surface. Alternatively, the film may be treated in other manner, for example, with a second material to cause coagulation or solidification of the polymers resulting in a insitu film separator. If applied to alkaline cell, the polymer should be chemically stable in aqueous alkaline electrolyte environment and electrochemically stable to contact with zinc anode and manganese dioxide cathodes. Also, said polymer itself can be either ionically permeable or non-ionically permeable in alkaline electrolyte. Examples of non-ionically permeable polymers include polyolefins, vinyl polymers and copolymers, polyamides, fluoropolymers and styrenic polymers and copolymers. If non-ionically permeable the polymer may be used to form a separator film structure provided the overall film structure is ion permeable. The overall film structure may be made ion permeable by adding a polymer which is ion permeable or by entrapping electrolyte within micropores within the film.

If the polymer itself is ion permeable the film formed of such polymer will generally result in an ion permeable film structure. Generally, polymers that are soluble or swellable in water will be ion permeable. Such polymers contain hydrophilic functionality in thier structure, such as hydroxyl, carboxylic acid (including salts of carboxylic acid), acrylamide, amino, ether, sulfonate, phosphate, quaternary ammonium, and vinyl pyrrolidone. Examples of ionically permeable polymers include hydrophilic modified vinyl polymers such as polyvinylalcohol and its copolymers (e.g., copolymers of polyvinylalcohol and polyvinylacetate), polyvinylpyridine, carboxylic acid substituted vinyl polymers such as polyacrylic acid and polymethacrylic acid and their copolymers; ethylene-maleic annhydride copolymer, polyvinylpyrrolidone, polyvinylsulfonic acid, polyvinylfluorosulfonic acid, polyvinylphosphonic acid, polyvinylphenol, vinyl toluene-maleic anhydride, vinyl sulfonate-vinyl amide and polyvinyltetrabutyl ammonium hydroxide. Other ionically permeable polymer include polyethers such as polyethylene oxide; cellulosic based polymers such as cellulose nitrate; cellulose ethers such as methyl and ethyl cellulose, carboxymethylcellulose, and hydroxyalkylcellulose; and cellulose esters such as cellulose acetate and cellulose acetate butyrate. Additional examples of ionically permeable polymers include hydrophilic modified acrylics such as polyacrylamide and polyhydroxyacrylamide, acrylamide-vinylsulfonic acid, acrylamide-vinyl pyrrolidone, acrylamide-acrylic acid and their copolymers. Additional examples of ionically permeable polymers include hydrophilically substituted polystyrene polymers such as styrene-methacrylic acid copolymer,dimethylamine adduct of styrene-maleic anhydride copolymer, polystyrenesulfonic acid, polystryrenefluorosulfonic acid, polystyrenephosphonic acid, polystyrenetetrabutylammonium chloride, polystyrenetetrabutylammonium hydroxide, polystyrene-co-maleic acid, and polystyrene-co-maleic anhydride. Additional examples of ionically permeable polymers include polyethyleneimine and polyamines; and polyvinyl ethers such as polymethylvinyl ether, polymethylvinyl ether/maleic anhydride and polymethylvinyl ether maleic acid and their copolymers. All polymers hertofore mentioned that contain carboxylic acid functionality can also be used in their salt form.

Regardless of whether the polymers contained within the coating or final separator film is ion permeable or non-ionically permeable, the polymers should be non dissolvable in either alkaline environment, e.g., pH>10 and/or an environment of high ionic strength, for example, high salt concentration (salt normality greater than 0.5N).

Another method for creating an insitu separator 290 is to coat the inside surface 217 of cathode 212 with a liquid that freezes into an ionically permeable solid insitu film separator 290. The material, for example, may be a liquid at elevated temperature but turns solid at room temperature. Therefore, the material is first heated so that it liquifies with low enough viscosity so that it becomes castable or coatable onto the surface 217 of cathode 212. As the material cools to ambient temperature it solidifes forming separator film 290. Examples of material which exhibit such properties are alkyl polyalcohols such as polyethylene glycol with a molecular weight greater than 900, preferably greater than 1500. Such material may be heated to a temperature high enough that its molten viscosity is less than 2000 cps, preferably less than 1000 cps, which makes it sutiable for coating onto cathode surface 217. Alternatively, the film on the electrode may be dried by heated or cooled convective air, ambient air, or by heated or cooled inert or other gaseous medium or by exposing the film to a vacuum or to an infrared or other radiation source to form an ion permeable separator on the electrode.

Another method for creating an insitu separator 290 is to coat the inside surface 217 of cathode 212 with a liquid monomer or prepolymer that polymerizes into a solid tonically permeable film. For example liquid vinyl ether oligomers and monomers such as triethylene glycol divinyl ether or 1,4 cyclohexanedimethanol divinyl ether containing a dissolved triarlysulfonium cationic photoinitiator, such as 3M Corp. FX-512, can be coated onto the inside surface 217 of cathode 212 then exposed to ultaviolet radiation whereupon the vinyl ether oligomers or monomers polymerize or crosslink into a solid ionically permeable separator film 290.

Performance Tests

AA alkaline cells as shown in FIG. 1 with the same conventional anode and cathode compositions and same conventional component construction, but with different separator is prepared and tested. The AA cell is prepared with a cell casing formed of steel which is plated on the inside and outside surface with nickel. (No additional coating was applied to the inside of the cell casing.) Conventional cathode and anode active material, electrolyte and anode current collector are employed. The current collector is a tin plated collector. The anode material is in the form of a gelled mixture containing mercury free (zero-added mercury) zinc alloy powder. Such mixture may typically contain aqueous KOH electrolyte solution, gelling agent, e.g. acrylic acid copolymer such as CARBOPOL C940 from B.F. Goodrich; and surfactants e.g. organic phosphate ester surfactant GAFAC RA600 from Rhone Poulenc. Specific formulations of representative zinc slurries are disclosed in European Patent Publication 0474382A1. The electrolyte is an aqueous solution of KOH containing about 40 wt % KOH and 2 wt % ZnO, hereinafter referred to as "aqueous KOH solution". The cathode in the cell has the following composition:

Electrolytic manganese dioxide (80–86 wt %), graphite (7–10 wt %), and a 7–11 Normal "aqueous KOH solution" (5–7 wt %).

The AA cells had stable open circuit voltages of 1.59V and remained stable for more than 1 month storage at 40 C for both the Formulation 1 and 2 separator containing cells as well as the fibrous separator control group. The AA cells were discharged at a constant high power rate of 1 Watt to a cut-off voltage of 0.8 Volts. The cell with the Formulation 1 separator of 2 mil (0.0508 mm) thickness exhibited an energy output of C.96 Watt-Hr. The AA cell with a the Formulation 2 separator of 2 mil (0.0508 mm) thickness with particulate zinc oxide exhibited an energy output of 0.98 Watt-Hrs. A like AA cell (comparison cell) was prepared with conventional separator comprising a single layer, 8 mil (0.203 mm) thickness of absorbent nonwoven material comprising fibrous polyvinylalcohol and cellulosic Rayon material. The comparison cell was also discharged at constant high power drain at 1 Watt to a cut-off voltage of 0.8 Volt. The energy output was 0.95 Watt-Hrs.

Additional AA cells were also pulse tested using a 500 millisecond 1.5A pulse load with a 1 second rest in-between pulses for a total of 10 pulses. The cell with the Formulation 1 separator (2 mil thickness) exhibited an average load voltage of 1.34V. The AA cell with a the Formulation 2 separator with particulate zinc oxide exhibited an average load voltage of 1.45V. A like AA cell (comparison cell) was prepared with conventional separator comprising a single layer, 8 mil (0.203 mm) thickness of absorbent nonwoven material comprising fibrous polyvinylalcohol and cellulosic Rayon material. The comparison cell exhibited an average load voltage of 1.29V. Thus both formulation prepared cells had higher load voltage and lower polarization than the conventional cells comprising separators of non-woven fibrous material. The zinc oxide filled formulation 2 exhibited the least polarization.

Additional AA cells were also polarized by discharging from zero millamps to 2500 millamps using a 20 milliamp per 30 second ramp (stepping) while recording the load voltage. Table 1 compares the load voltage at 1.5V, 1.0V, 0.5V and zero volts of the three comparison groups. (The fibrous separator control is as described above.)

TABLE 1

| Separator Group | Current @ 1.5 V | Current @ 1.0 V | Current @ 0.5 V | Current @ 0 volts |
|---|---|---|---|---|
| Formulation 1 | 250 ma | 1400 ma | 1800 ma | 2000 ma |
| Formulation 2 | 250 ma | 1400 ma | 1950 ma | 2450 ma |
| Fibrous control | 250 ma | 1400 ma | 2000 ma | 2300 ma |

In this polarization test all three groups of separators showed good performance, but the zinc oxide filled separator Formulation 2 had the lowest polarization (as reflected by the last column of Table 1) followed by the comparative fibrous nonwoven separator group and Formulation 1 separator group respectively. (The formulation 1 separator had a thickness of 2 mil (0.0508 mm); the formulation 2 separator had a thickness of 2 mil (0.0508 mm); and the fibrous control separator a thickness of 8 mil (0.203 mm).

With the separator given in Formulation 1 the absorbency is not as high as conventional fibrous separators and accordingly it is desirable to wet the solid cathode material with additional electrolyte, if desired, before the separator is coated onto the cathode. However, with the separator embodiments having improved absorbency (Formulations 2) the cathode may be prewetted with electrolyte either before the separator is applied or after the separator solid film is formed on the cathode. In the latter case electrolyte may be added to the anode cavity 222 after the separator solid film is formed but prior to insertion of the anode slurry 215. Electrolyte will be absorbed into the separator 290 and a portion will pass therefrom into the cathode 212. After the cathode has thus been prewetted with electrolyte, the anode material 215 may be inserted into the anode cavity 222.

In another embodiment the absorbency of the insitu separator of the invention may also be improved by applying an absorbent powder coating (top coat) to the coating liquid (Formulations 1 or 2) after the liquid has been applied to the cathode surface and preferably after the liquid has been coagulated with alkaline (KOH). The absorbent powders may be desirably applied in thickness of about 1 mil (0.0254 mm). An effective absorbent powder, for example, may be acrylic acid grafted starches, crosslinked polyacrylic acid, crosslinked polyvinylpyrrolidone, polyacrylamide, polyhydroxyacrylamide and other powder which are swellable or absorbent, yet stable in alkaline electrolyte. Such top coat powders may be prepared, for example, from acrylic acid grafted starches such as A221 from Grain Processing Inc., CARBOPOL 940 crosslinked polyacrylic acid (M.W. 5,000, 000) from B.F.Goodrich Company, CABOSIL M5 fumed silica from Cabot Corp., or CROSSPOVIDONE NF polyvinylpyrrolidone (20 to 50 micron average particle size) from GAF Co.

In another embodiment the absorbency of the insitu separator of the invention may also be improved by mechanically applying an electrolyte absorbent nonwoven or woven web-like material to the exposed surface of the insitu separator after the insitu separator is formed on the surface of the electrode, or the absorbent web can first be mechanically placed against the electrode surface and the insitu separator of the invention applied over the absorbent web.

Figure 6:
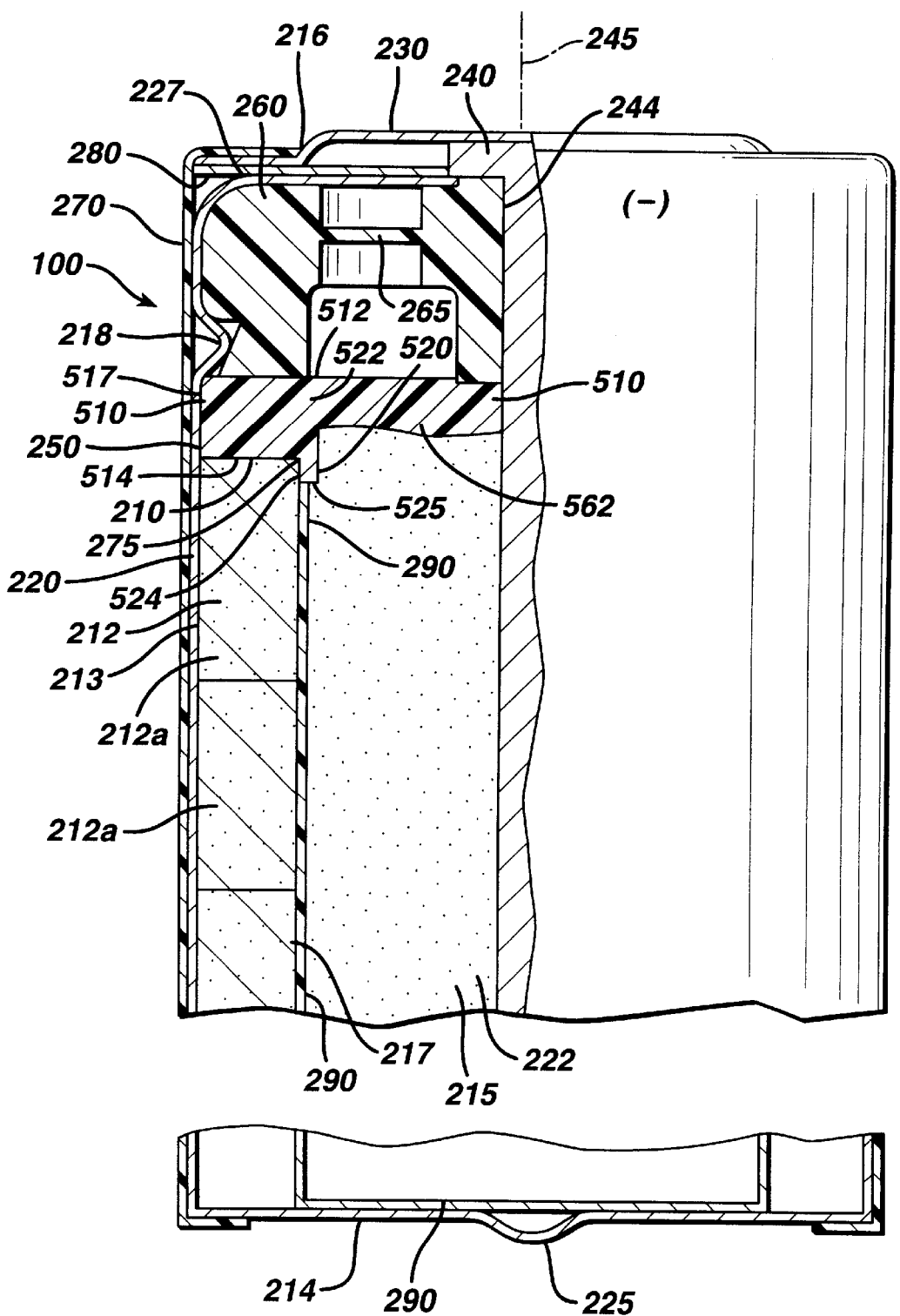
FIG. 6 is a cross sectional elevational view of a representative alkaline cell employing the separator of the invention and with the cathode edge protector of the invention inserted onto the cathode top surface.

Another embodiment of the invention is shown in FIG. 6 and related FIGS. 7–10. The cell embodiment shown in FIG. 6 is similar to that shown and described with respect to FIG. 1 in that it has an annular cathode 212 and separator 290 adhering to the inside cathode surface 217. However, in the embodiment shown in FIG. 6 a cathode edge protector 510 of the invention is inserted over the top surface 210 of cathode 212. Protector 510 is electrically insulating. Cathode top surface 210 is typically a flat surface. (Cathode top surface 210 as the term is used herein shall be understood to be the cathode surface in closest proximity to the cell's open end 216.

Figure 7:
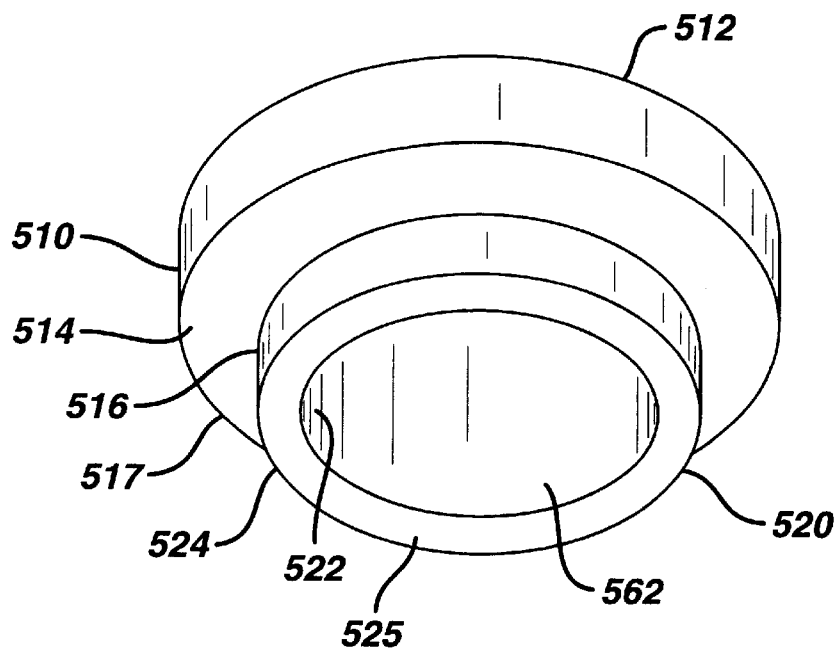
FIG. 7 is an isometric view of an embodiment of the cathode edge protector of the invention for insertion onto the annular cathode shown in FIGS. 1 and 6.
Figure 7A:
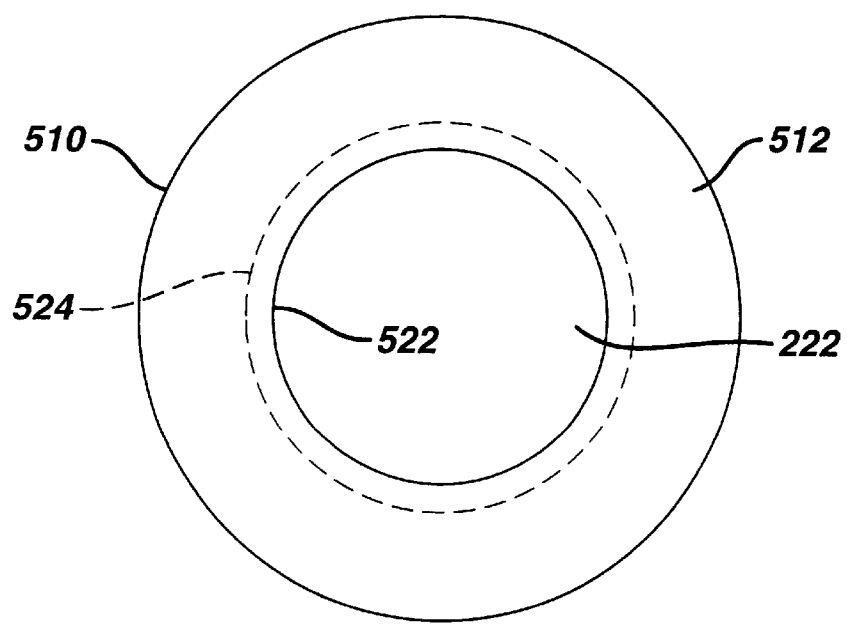
FIG. 7A is a top view of the cathode edge protector shown in FIG. 7.

The cathode edge protector 510 show in detail in FIG. 7 can be in the shape of a disk having a solid annular surface 514 which lies flush against the top cathode surface 210 (FIG. 6). Solid surface 514 conforms to the curvature of top cathode surface 210 which is preferably flat. A lip 520 protrudes downwardly from the inside edge 516 of annular surface 514 as shown in FIGS. 6 and 7. Protruding lip 520 is preferably a continuous cicumferential surface defining a hollow core 562 for insertion of anode material 215. The hollow core 562 can be circular as show in FIG. 7 or other shape conforming to the shape and size of the anode cavity 222 when viewed in cross section taken perpendicular to longitudinal axis 245. The disk shaped cathode edge protector 510 in the embodiment shown in FIG. 7 is designed to fit over top surface 210 an annular shaped cathode 212. When inserted over the cathode top surface 210, the outside surface 517 of edge protector 510 preferably lies flush against the inside surface 250 of casing 220. The insulating sealing disk (plug) 260 can be inserted into the open end 216 of the casing so that the plug 260 contacts the top surface 512 of protector disk 510 as shown in FIG. 6 to provide a seal between plug 260 and the protector disk 510. The top surface 512 of protector disk 510 can also interlock with plug 260 through matching surface grooves. Protruding circumferential lip 520 extends downwardly so that its bottom edge 524 extends downwardly between about 0.5 and 2 mm, typically between about 0.5 an 1.5 mm, preferably about 1 mm from the cathode top surface 210. The protector 510 thereby also covers the top inside corner edge 275 of cathode 212. Thus, the edge protector disk 510 has the annular surface 514 which contacts and lies tightly against cathode top surface 210, and also has the intersecting portion of surfaces 514 and 524 covering the inside corner edge 275 of cathode 212. The protector disk can also have outer edge portion 517 positioned to press tightly against the portion of inside surface 250 of casing 220 immediately above cathode top surface 210. The placement of protector disk 510 in this manner assures that there can be no shorting caused by anode material infiltrating unprotected regions caused in extreme conditions by cracking or creeping of the separator film 290 along the separator portions 290a, 290b and 290c shown in FIG. 1. Such cracking or creeping of the insitu separator 290 of the invention in these regions is not ordinarily expected but could possibly occur, for example, if the polymeric coating forming separator film 290 was not carefully applied to such regions or the cell was hammered or harshly vibrated. In any event the insertion of the edge protector disk 510, as above described, gives a measure of added protection against shorting along the cathode top surface 210 and inside surface of the cell casing immediately above the cathode top surface where shorting, would be most likely to occur in such extreme conditions.

The cathode edge protector disk 510 is composed of electrically insulating material which is durable and substantially rigid and can withstand contact with alkaline electrolyte solution without corroding or distorting. In this respect the protector disk 510 can be formed of the same material which is normally used for insulating sealing disk (plug) 260. Thus, protector disk 510 is desirably formed of polypropylene or nylon. Protector disk 510 can be inserted without applying adhesive or sealant material to its contact surfaces. However, it will be appreciated that the contact surfaces 512, 514, 517, and 524 and can be optionally precoated with sealant material. Such sealants, for example, can be selected from sealants commonly employed in sealing insulating plug 260 against cell casing 220. Thus, the contact surface of protector disk 510 can optionally be precoated with sealant material which comprises fatty polyamide, for example, as disclosed in U.S. Pat. No. 3,922,178, asphalt as disclosed in U.S. Pat. No. 4,740,435, or thermoplastic elastomeric material as disclosed in U.S. Pat. No. 5,332,633.

The protector disk 510 shape is not intended to be limited to the shape illustrated in FIG. 7 which is designed for insertion over a conventional smooth annular cathode having an inside surface 217 defining a circular anode cavity. The invention is thus applicable whenever it is desired to provide added insulating protection to the cathode top surface 210 and corner 275. Thus, the shape of the cathode edge protector disk 510 can be altered to conform to cathodes having convoluted inside surfaces of any shape or surface irregularity.

For example, four individual protector disks 510 of generally of the same shape and configuration as shown in FIG. 7 can be made of smaller size so that the protruding lip 520 fits into the smaller individual cavities 322a–322d shown in FIG. 2. The annular surface 514 of the protector 510 will then lie flush against the top surface of cathode 312 (FIG. 2) in a manner similar to that shown in FIG. 7. Protruding lip 520 of each protector disk 510 (FIG. 7) will penetrate into the respective cavity 322a–322d so that it comes to rest flush against the inside surface of cathode surface defining each of the cavities. The protruding lip 520 of each of the protector disks 510 shown in FIG. 7 can extend into each anode cavity desirably between about 0.5 and 2 mm, preferably between about 1.5 and 1.5 mm, thus protecting the separator at its top edge. Alternatively, the protector disk 510 can be of single piece construction with four individual circular protruding lips extending therefrom for insertion into the respective individual cavities 322a–322d shown in FIG. 2. Each of the protruding lips 520 would define a hollow cores conforming to the size and shape of the cavities 322a–322d.

Figure 10:
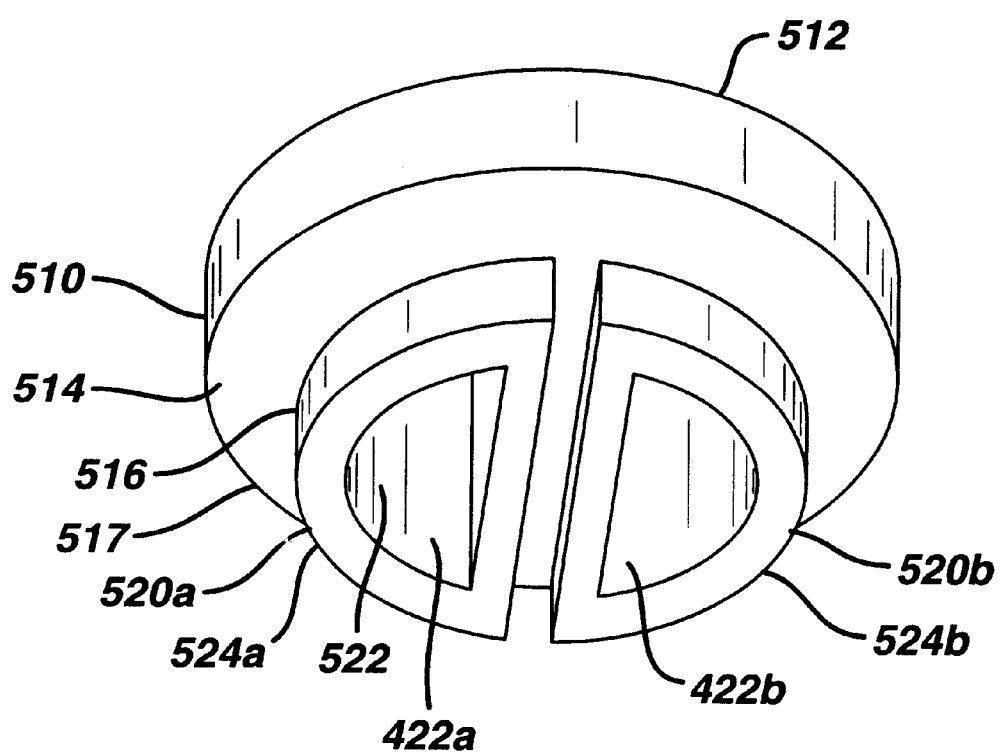
FIG. 10 is an isometric view of another embodiment of the cathode edge protector of the invention for insertion onto the annular cathode shown in FIG. 4.

In another embodiment the protector 510 can have a semicircular shape so that it can fit over a semicircular shaped anode cavity, for example as shown in FIG. 4. Thus, two semicircular protectors 510 each with a protruding lip 520 in the shape of the paired semicircular anode cavities shown in FIG. 4 could be employed to protect the top surface of the cathode 412. Each protruding edge 520 is desirably between about 0.5 an 2 mm, preferably between 0.5 and 1.5 mm in length. The two semicircular protectors 510 can be inserted so that their protruding edges 520 is inserted into respective anode cavity 422a and 422b (FIG. 4). The outside surface 524 of each protruding lip 520 will lie flush against the top inside surface of the cathode in a manner similar to the shown in FIG. 7. The annular surface 514 of each semicircular protector 510 will also lie flush against the top surface of the cathode 412 in the manner similar to that shown in FIG. 7 with respect to cathode 212. Alternatively, the cathode edge protector 510 for use in connection with the paired semicircular cathode embodiment of FIG. 4 can be of single piece construction as shown in FIG. 10. In such case there could a pair of protruding lips 520a and 520b protruding from a single annular surface 514. Each protruding lip 520a and 520b would have a surface 524a and 524b, respectively, defining a hollow core corresponding to the size and shape of each of the semicircular cavities 422a and 422*b*, respectively shown in FIG. 4. Thus, when the single piece protector 510 (FIG. 10) is placed onto the top surface of the cathode 412*a* (FIG. 4), the outside surface 524*a* and 524*b* of each protruding lip 520 will penetrate into the respective semicircular cavities 422*a* and 422*b*. The outside surface 524*a* and 524*b* of each protruding lip 520*a* and 520*b*, will abut the inside surface 417*a* and 417*b*, respectively, of the cathode at its top end. The annular surface 516 (FIG. 10) of protector 510 will also come to rest against the cathode top surface 410*a* thereby protecting the cathode top surface.

Figure 8:
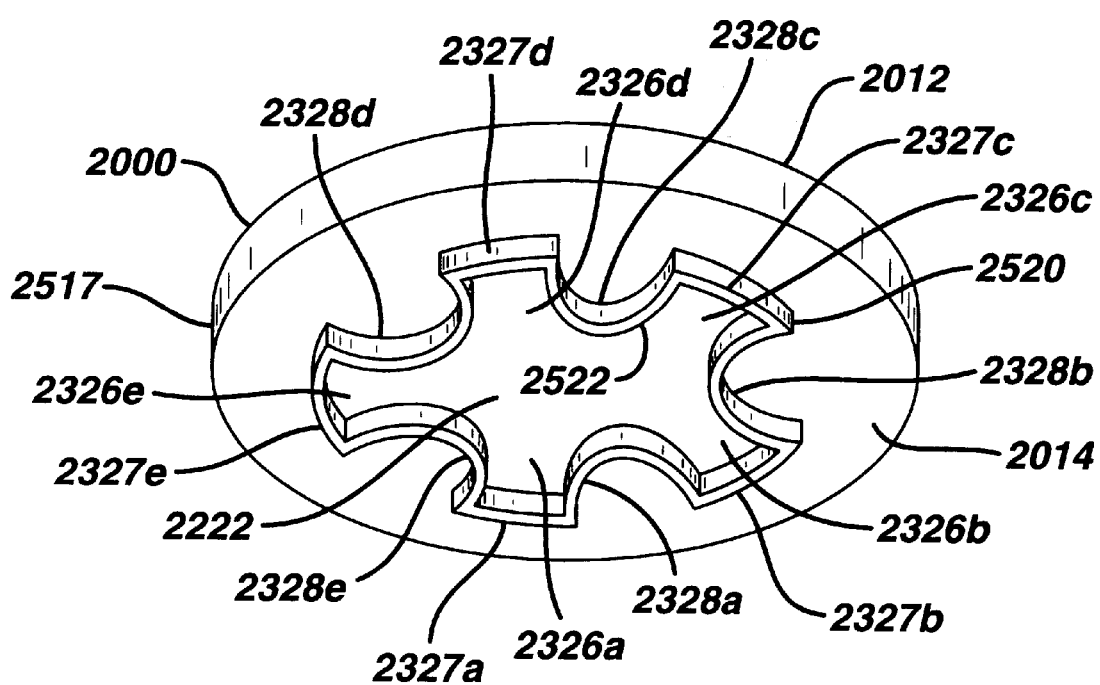
FIG. 8 is an isometric view of another embodiment of the cathode edge protector of the invention for insertion onto the cathode embodiment of FIG. 9 having a convoluted inside surface.
Figure 9:
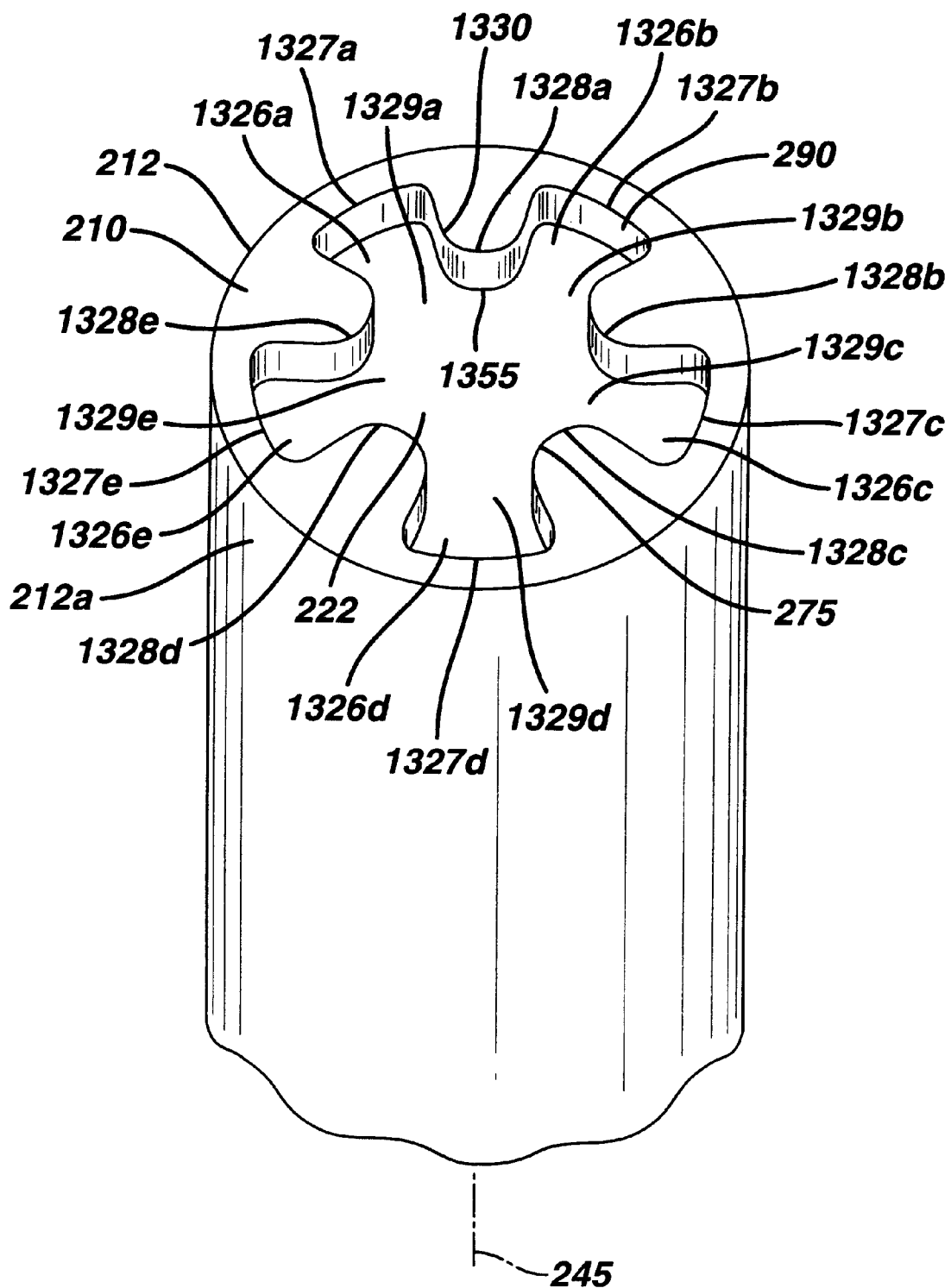
FIG. 9 is an annular cathode embodiment having a convoluted inside surface.

Another embodiment of the cathode edge protector disk of the invention is illustrated, by way of example, as protector disk 2000 as illustrated in FIG. 8. The protector disk 2000 is similar to disk 510 shown in FIG. 7 in that it has a substantially annular surface 2014 which terminates at its inside surface with a downwardly protruding lip 2520 which forms a hollow core 2222. However, the inside surface of protruding lip 2520 has five regularly spaced indentations 2327*a*–2327*e* therein. Each indentation 2327*a*–2327*e* has a channel 2326*a*–2326*e* running along it length. The shaped protector inside surface 2522 defining indentations 2327*a*–2327*e* as shown in FIG. 8 forms five convex shaped surfaces (lobes) 2328*a*–2328*e* when viewed from the cell's central longitudinal axis. Concave surface portions 2327*a*–2327*e* are located between convex lobes 2328*a*–2328*e*. The concave surface portions 2327*a*–2327*e* are thus spaced apart from each other by the convex portions 2328*a*–2328*e*. The convex surface portions 2328*a*–2328*e* are preferably of the same size and shape and concentrically equally spaced as shown in FIG. 8. Similarly the concave surface portions 2327*a*–2327*e* are preferably of the same size and shape and concentrically equally spaced as shown in FIG. 8. The protector disk 2000 is designed to fit over the top surface of cathode 212 having similar convoluted inside surface as shown in FIG. 9. Thus, cathode 212 shown in FIG. 9 has an inside surface with corresponding five indentations 1327*a*–1327*e* forming five similar shaped inside surface with five convex shaped surfaces (lobes) 1328*a*–1328*e* when viewed from the cell's central longitudinal axis.

Each indentation 1327*a*–1327*e* has a channel 1326*a*–1326*e*, respectively, running along the length of the cathode 212 and preferably parallel to the cell's central longitudinal axis 245. Each indentation 1327*a*–1327*e* is preferably, although not necessarily, of the same size and shape and symmetrically oriented around cathode inside surface 1355. Each indentation 1327*a*–1327*e* is defined by an indentation wall defining a indentation channel 1326*a*–1326*e*, respectively, running along the indentation's length. Each indentation 1327*a*–1327*e* is formed of a continuous wall surface having an opening 1329*a*–1329*e*, respectively, which faces the cell's interior and allows access to the indentation channel from the interior of the cell. Each opening 1329*a*–1329*b* preferably has a width between about 0.2 and 0.40 of the housing 220 radius. The cathode inside surface 1355 curvature is preferably a closed surface having the symmetrical curvature defining the indentations shown in FIG. 9. The shaped cathode inside surface 1355 defining indentations 1327*a*–1327*e* as shown in FIG. 9 forms five convex shaped surfaces (lobes) 1328*a*–1328*e* when viewed from the cell's central longitudinal axis. Concave surface portions 1327*a*–1327*e* are located between convex lobes 1328*a*–1328*e*. The concave surface portions 1327*a*–1327*e* are thus spaced apart from each other by the convex portions 1328*a*–1328*e*. The convex surface portions 1328*a*–1328*e* are preferably of the same size and shape and concentrically equally spaced as shown in FIG. 9. Similarly the concave surface portions 1327*a*–1327*e* are preferably of the same size and shape and concentrically equally spaced as shown in FIG. 9. The inside surface 1355 defines hollow core 222.

Figure 11:
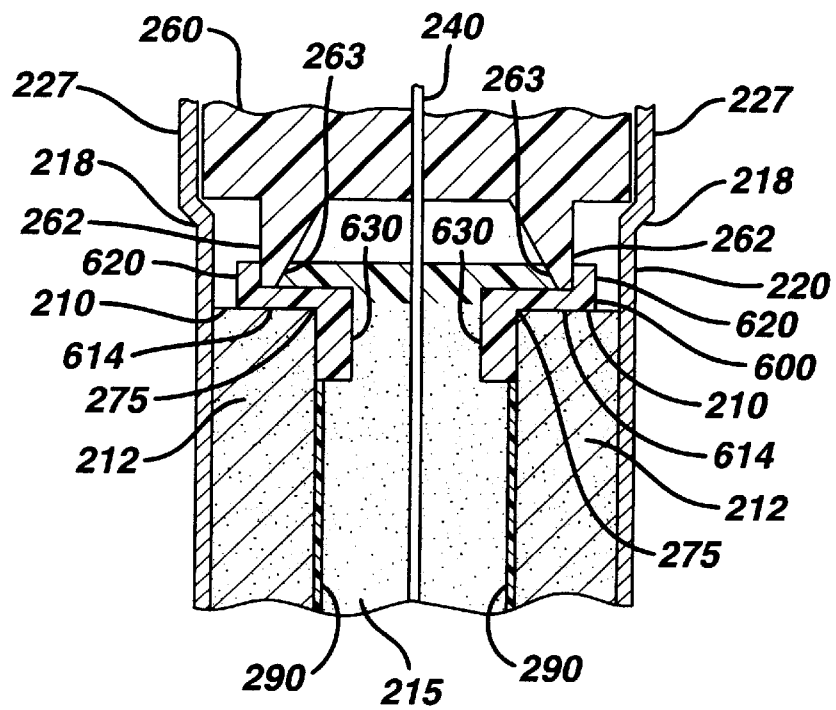
FIG. 11 is a partial cross sectional view of another embodiment of the cathode edge protector of the invention shown interlocking with an insulating sealing disk.

After cathode 212 having the configuration shown in FIG. 9 is inserted into casing 220, the insitu separator 290 can be coated onto the inside surface 1355 of the cathode. The protector disk 2000 (FIG. 8) can then be pressed onto the top surface 210 of the cathode 212 shown in FIG. 9 so that the indentations 2327*a*–2327*e* and convex lobes 2328*a*–2328*e* fit snugly, respectively, against corresponding indentations 1327*a*–1327*e* and convex lobes 1328*a*–1328*e* at the top surface of cathode 212 (FIG. 9). The hollow core 2222 of the protector disk 2000 conforms to the shape of cavity 222. The protector disk is pressed so annular surface 2014 will come to rest flush against the top cathode surface 210 (FIG. 9) with each of the indentations 2327*a*–2327*e* pressed into the respective indention channels 1326*a*–1326*e*. This results in protector disk 2000 (FIG. 8) covering the top surface 210 of cathode 212 (FIG. 9). The outside surface 2517 of the protector disk then also becomes lodged flush against the portion of inside surface 250 of casing 220 immediately above the cathode top surface similar to that described with respect to the regular annular shaped cathode embodiment illustrated in FIG. 6. Protruding lip 2520 of the protector disk 2000 is desirably between about 0.5 and 2 mm, preferably between about 0.5 and 1.5 mm in length. Thus the cathode top surface 210 and top inside edge 275 of the cathode embodiment shown in FIG. 9 will be covered by protector disk 2000. This provides added protection against any possible shorting in those regions because of infiltration of anode material through any cracks in the separator which could develop at the cathode top surface 210. This embodiment has the advantage of providing an interlock between sealing disk 260 and protector disk 600 as shown in FIG. 11. Therefore it is not required that the protector disk 600 contact the inside surface of casing 220, since anode material will not be able to penetrate through the interlock.

Another embodiment of the protector disk of the invention is shown in FIG. 11. A separator 290 made by the insitu process of the invention is shown adhered to the inside surface of cathode 212. The protector disk 600 is inserted over cathode 212 so that its annular surface 614 covers at least a portion of the cathode top surface 210. The protector disk 600 has a raised circumferential outer edge 620 which interlocks with downwardly protruding circumferential skirt 262 of insulating sealing disk (plug) 260. Insulating sealing disk 260 preferably has a rupturable membrane 265 therein as shown, for example, in FIG. 6. The end 263 of downwardly protruding skirt 262 interlocks with raised outer edge 620 of the protector disk 600 to provide a tight seal therebetween. The protector disk 600 also has a downwardly protruding integral circumferential lip 630 which intersects with the protector disk annular surface 614. Lip 630 extends downwardly about 1 to 3 mm or more from annular surface 614. The protector disk 600 covers and protects the top inside corner 275 of cathode 212 at the intersection of annular surface 614 and protruding edge 630 as shown in FIG. 11. This embodiment does not require that the protector disk 600 extend laterally to contact casing 220, since anode material 215 will not be able to penetrate through or over protector disk 600. It will be appreciated that a coating of sealant can optionally be preapplied at the intersection of annular surface 614 and lip 630 before the protector disk 600 is applied to the cathode top surface 210. After the cell components shown in FIG. 11 are inserted into casing 220, the casing peripheral edge 227 can be radially compressed so that the casing outside diameter is uniform along its length as shown, for example, in FIG. 6.

Figure 12:
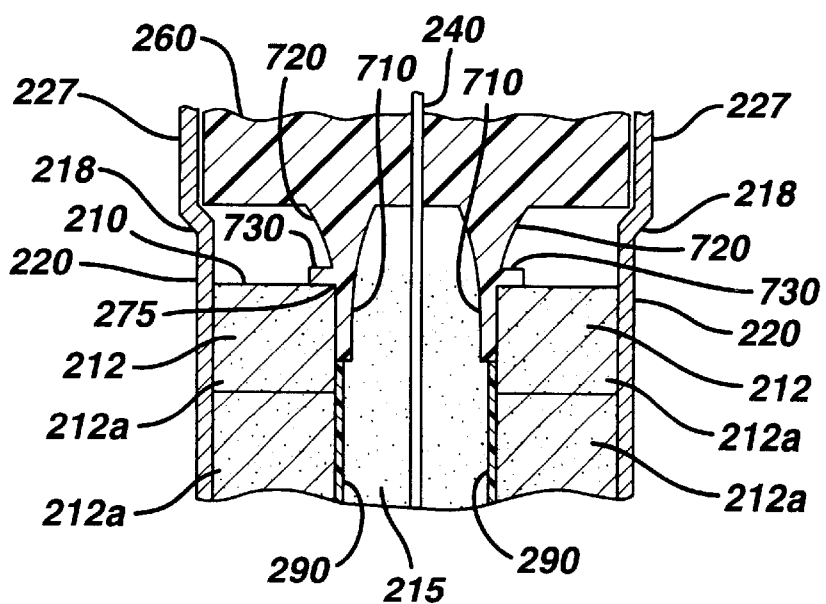
FIG. 12 is a partial cross sectional view of an embodiment showing an insulating sealing disk with an extended circumferential skirt having a portion thereof contacting and covering a portion of the cathode surface.

In another embodiment shown in FIG. 12 the function of the protector disk can be accomplished by extending the length of downwardly protruding skirt 720 so that it contacts and covers the top inside corner 275 of cathode 212. A separator 290 made by the insitu process of the invention is shown adhered to the inside surface of cathode 212. Specifically, as shown in FIG. 12 insulating sealing disk (plug) 260 has a downwardly protruding circumferential skirt 720 which terminates in end 710. Insulating sealing disk 260 preferably has a rupturable membrane 265 therein as shown, for example, in FIG. 6. The end 710 of skirt 720 is aligned with the inside surface of cathode 212. An integral lateral circumferential flange 730 extends laterally from skirt 720 on the side of skirt 720 facing the casing 220. Flange 730 thus intersects with end 710 so that when insulating sealing disk 260 is inserted into casing 220, the intersection of flange 730 and end 710 contacts and covers the inside top inside corner 275 of cathode 212. Protruding skirt 720 provides a impenetrable barrier preventing anode material 215 from reaching any portion of the top surface 210 of the cathode. In this embodiment it is not necessary for any portion of skirt 720 or flange 730 to contact the inside surface of casing 220 in order to protect the cathode top surface 210, since an impenetrable barrier between anode material 215 and the cathode top surface 210 is provided as shown in FIG. 12. It will be appreciated that a coating of sealant can optionally be applied at the intersection of flange 730 and end 710 of protruding skirt 720 to provide a tighter seal, if desired, between protruding skirt 720 and cathode top inside corner 275. After the cell components shown in FIG. 12 are inserted into casing 220, the casing peripheral edge 227 can be radially compressed so that the casing outside diameter is uniform along its length as shown, for example, in FIG. 6.

Although the present invention was described with respect to specific embodiments, it should be recognized that variations are possible without departing from the concept of the invention. Thus, the invention is not intended to be limited to the specific embodiments, but rather its scope is reflected by the claims and equivalents thereof.

What is claimed is:

1. In an alkaline electrochemical cell, said cell having an open ended cylindrical casing, said cell having a positive and a negative terminal, an anode comprising zinc and a cathode comprising manganese dioxide, said cathode having an outside surface contacting said casing and an inside surface of said cathode facing said anode, a separator contacting said inside surface of the cathode, an electrically insulating sealing disk having a rupturable membrane therein, said insulating sealing disk having an electrically conductive current collector passing therethrough, said insulating sealing disk sealing the open end of said casing and providing electrical insulation between said current collector and said casing, the improvement comprising:

the separator being a film adhering to the inside surface of the cathode;

an electrically insulating protector disk in contact with a surface of said cathode, said protector disk being a separate component not an integral portion of said sealing disk, said protector disk being located between said cathode and said insulating sealing disk, wherein the cathode runs along the length of the inside surface of said casing, wherein said cathode has a top surface defined as the surface of the cathode in closest proximity to the open end of the casing, wherein the protector disk has a solid surface having a hollow core therethrough, and wherein said protector disk solid surface is in contact with said cathode top surface covering said cathode top surface.

2. The cell of claim 1 wherein the protector disk has a lip protruding from said solid surface, wherein said lip forms a continuous closed surface defining said hollow core, wherein said lip covers a portion of the inside surface of said cathode facing said anode.

3. The cell of claim 1 wherein said protector disk interlocks with said insulating sealing disk providing a seal therebetween.

4. In an alkaline electrochemical cell, said cell having an open ended cylindrical cell casing and an end cap assembly inserted therein closing said casing, said cell having a positive and a negative terminal, an anode comprising zinc, and a cathode comprising manganese dioxide, said cathode having an outside surface contacting said casing and an inside surface of said cathode facing said anode, a separator contacting said inside surface of the cathode, said end cap assembly comprising an end cap and an electrically insulating sealing disk having a rupturable membrane therein, said insulating sealing disk having an elongated electrically conductive current collector passing therethrough, the current collector being in electrical contact with the end cap, said insulating sealing disk sealing the open end of said casing and providing electrical insulation between said current collector and said casing, the improvement comprising:

the separator being a film adhering to the inside surface of the cathode;

an electrically insulating protector disk in contact with a surface of said cathode, said protector disk being a separate component not an integral portion of said sealing disk, said protector disk being located between said cathode and said insulating sealing disk, wherein said protector disk has a solid surface having at least one hollow core therethrough, wherein said protector disk interlocks with said insulating sealing disk, wherein the cathode runs along the length of the inside surface of said casing, wherein said cathode has a top surface defined as the surface of the cathode in closest proximity to the open end of the casing, and wherein said protector disk is in contact with said cathode top surface covering said cathode top surface.

5. The cell of claim 4 wherein said solid surface of the protector disk forms an annular surface conforming to the top surface of the cathode, thereby covering said cathode top surface.

6. The cell of claim 5 wherein the protector disk has a lip protruding from said protector disk solid surface, said protruding lip defining said hollow core.

7. The cell of claim 6 wherein said lip forms a circumferential surface defining said hollow core.

8. The cell of claim 7 wherein said lip is perpendicular to said protector disk solid surface.

9. The cell of claim 7 wherein said lip covers a portion of the inside surface of said cathode facing said anode.

10. The cell of claim 9 wherein said cathode is in the form of an elongated annulus having a top surface, an outside surface and an inside surface, wherein said cathode outside surface contacts said casing and said cathode inside surface faces said anode with said separator therebetween, wherein said cathode top surface faces the open end of the cell, wherein said cathode top surface intersects with said cathode inside surface to from a top inside edge of said cathode, wherein said protector disk comprising said protruding lip covers said top inside edge of the cathode.

11. The cell of claim 10 wherein said cell has an anode cavity for insertion of said anode and the shape of said protector hollow core defined by said protruding lip conforms to the shape of said anode cavity.

12. The cell of claim 11 wherein said hollow core of the protector disk is of circular shape.

13. The cell of claim 10 wherein the protector disk has an outer edge which contacts a portion of the inside surface of said casing immediately above said cathode top surface.

14. The cell of claim 10 wherein said protector disk contacts said insulating sealing disk providing a seal therebetween.

15. The cell of claim 10 wherein the inside surface of said cathode is convoluted.

16. The cell of claim 15 wherein the inside surface of said cathode is a circumferential convoluted surface having alternating convex and concave curvatures.

17. The cell of claim 10 wherein said separator is a polymeric coating adhered to the inside surface of said cathode.

18. The cell of claim 17 wherein said separator is a polymeric film comprising a copolymer of polyvinylalcohol and polyvinylacetate.

* * * * *